United States Patent
Sasaki et al.

(10) Patent No.: US 8,018,823 B2
(45) Date of Patent: Sep. 13, 2011

(54) OPTICAL RECORDING MEDIUM HAVING A RELATION BETWEEN GROOVE WIDTHS, GROOVE DEPTHS AND TRACK PITCHES

(75) Inventors: Hidehiro Sasaki, Minato-ku (JP); Masae Kubo, Minato-ku (JP); Kenjirou Kiyono, Minato-ku (JP)

(73) Assignee: Mitsubishi Kagaku Media Co., Ltd, Tokyo (JP)

( * ) Notice: Subject to any disclaimer, the term of this patent is extended or adjusted under 35 U.S.C. 154(b) by 9 days.

(21) Appl. No.: 12/515,075

(22) PCT Filed: Nov. 28, 2007

(86) PCT No.: PCT/JP2007/072984
§ 371 (c)(1),
(2), (4) Date: Jul. 20, 2009

(87) PCT Pub. No.: WO2008/069078
PCT Pub. Date: Jun. 12, 2008

(65) Prior Publication Data
US 2010/0034074 A1    Feb. 11, 2010

(30) Foreign Application Priority Data

Nov. 30, 2006 (JP) ................................. 2006-324452
Mar. 20, 2007 (JP) ................................. 2007-073272

(51) Int. Cl.
*G11B 7/24* (2006.01)
(52) U.S. Cl. .................................................. 369/275.4
(58) Field of Classification Search .............. 369/275.4, 369/275.3, 275.2, 275.1, 44.26, 277, 278, 369/279; 428/64.1, 64.2, 64.4; 430/321, 320, 270.1, 270.11, 270.13
See application file for complete search history.

(56) References Cited

U.S. PATENT DOCUMENTS

| | | |
|---|---|---|
| 5,023,856 A | 6/1991 | Raaymakers et al. |
| 5,344,682 A | 9/1994 | Mizukuki et al. |
| 7,102,986 B2 * | 9/2006 | Moribe et al. ............. 369/275.3 |
| 2001/0043515 A1 | 11/2001 | Ueki |
| 2003/0002429 A1 | 1/2003 | Morita |
| 2003/0072251 A1* | 4/2003 | Kondo ....................... 369/275.3 |
| 2003/0174602 A1 | 9/2003 | Abe et al. |
| 2004/0001414 A1 | 1/2004 | Kadowaki et al. |

(Continued)

FOREIGN PATENT DOCUMENTS

EP        0 518 213 A2    12/1992

(Continued)

*Primary Examiner* — Tan X Dinh
(74) *Attorney, Agent, or Firm* — Oblon, Spivak, McClelland, Maier & Neustadt, L.L.P.

(57) ABSTRACT

An information recording medium having a recording track wherein the recording track includes a first recording region R1, a second recording region R2 and a recording region transition section Sx arranged between regions R1 and R2; a track pitch tp1, a groove width w1 and a groove depth d1 in region R1, and a track pitch tp2, a groove width w2 and a groove depth d2 in region R2 satisfy formula (1), (2) and/or (3); the recording region transition section Sx includes a track pitch transition section Stp in which the track pitch changes from tp1 to tp2 and a groove shape transition section Sg in which the groove width changes from w1 to w2 and/or the groove depth changes from d1 to d2; and the track pitch transition section Stp and the groove shape transition section Sg at least partially overlap to share a region SL.

18 Claims, 11 Drawing Sheets

U.S. PATENT DOCUMENTS

| | | | |
|---|---|---|---|
| 2004/0076110 A1* | 4/2004 | Hino et al. | 369/275.3 |
| 2005/0030881 A1* | 2/2005 | Endoh et al. | 369/275.4 |
| 2005/0157613 A1* | 7/2005 | Ogasawara et al. | 369/275.4 |
| 2005/0237910 A1* | 10/2005 | Martens | 369/275.4 |
| 2009/0207713 A1* | 8/2009 | Nishiwaki et al. | 369/275.4 |

FOREIGN PATENT DOCUMENTS

| | | |
|---|---|---|
| EP | 1 345 219 A2 | 9/2003 |
| JP | 63 103454 | 5/1988 |
| JP | 5 198012 | 8/1993 |
| JP | 10 198961 | 7/1998 |
| JP | 2001-307382 | 11/2001 |
| JP | 2002 92890 | 3/2002 |
| JP | 2002-237100 | 8/2002 |
| JP | 2003-338039 | 11/2003 |
| JP | 2003 346384 | 12/2003 |
| JP | 2006-12355 | 1/2006 |
| WO | WO 2007/010825 A2 | 1/2007 |
| WO | WO 2007/010825 A3 | 1/2007 |

* cited by examiner

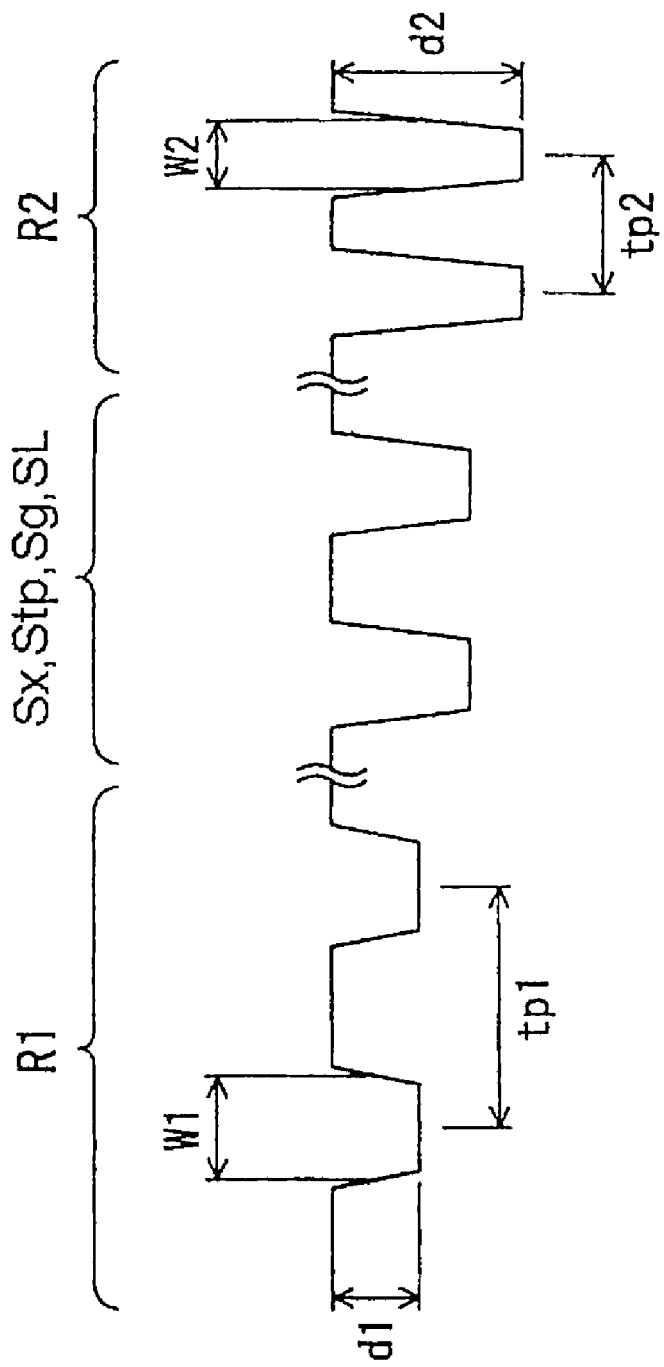

⇩ Exposure 504

⇩ Development

⇩ Formation of conductive layer 505

⇩ Electroplating

Separation, photoresist removal

⇩ Formation of separation layer

⇩ Electroplating

Separation

OPTICAL RECORDING MEDIUM HAVING A RELATION BETWEEN GROOVE WIDTHS, GROOVE DEPTHS AND TRACK PITCHES

TECHNICAL FIELD

The present invention relates to an information recording medium such as Blu-ray disc and a master exposing apparatus for producing such an information recording medium.

BACKGROUND ART

In an information recording medium such as Blu-ray disc, a recording layer is formed on a substrate, and this construction enables writing or reading of data by converging light on the recording layer.

Further, a track of spiral shape is formed on the medium, and reading and writing of data is carried out by converging laser beam along the track while the information recording medium is placed on and rotated by e.g. a spindle motor.

The track is realized by a groove or pits physically engraved on a substrate. For example, in a recordable Blu-ray disc, a track was realized by a groove. Further, for example, in a read only type Blu-ray disc, a track was realized by pits.

Here, a groove means a concave-convex pattern physically and continuously formed along a circumferential direction of an information recording medium. Further, pits mean concave-convex patterns discontinuously formed in a circumferential direction of an information recording medium, and a plurality of pits arranged in the circumferential direction of the information recording medium constitutes a track.

Here, some type of information recording medium has both a groove and pits engraved in respective regions of a single information recording medium. Namely, there is a case where a region in which only a groove is engraved is used as a recordable region and a region in which only pits are engraved is used as a read only region.

Meanwhile, in a case of recordable Blu-ray disc, e.g. the most suitable recording power of the information recording medium or a media manufacturer information are recorded on the information recording medium as control data in advance (a region in which control data is recorded is referred to as "control data region", and it may also be referred to as "PIC region" as described later.). Recording of control data is achieved by wobbling a groove by a modulation method different from that in a user data region.

Here, wobbling is achieved by displacing a groove in a very small amount in the radial direction of an information recording medium with a predetermined amplitude and pattern. Further, the modulation method is a conversion method for converting data that is desired to be recorded in advance, into a predetermined wobble pattern. Here, in the following description, for simplification, "a modulation method used for wobbling a groove" is simply referred to as "wobble modulation method".

Further, in a recordable Blu-ray disc, in order to ensure reading of control data by a drive, a track pitch in the control data region is formed larger than a track pitch in the user data region.

Here, a track pitch means a distance between centers of adjacent to tracks when the information recording medium is observed in the radial direction. As described above, in a recordable Blu-ray disc, the groove is wobbled in the radial direction of information recording medium by a small amount, but at a time of discussing the value of track pitch, wobble of the groove is not considered. Accordingly, the track pitch is equal to an average distance between grooves when the information recording medium is observed in the radial direction.

A laser beam irradiated on the information recording medium is partially reflected, and the reflected beam is received in e.g. a two-segment photodetector.

FIGS. 15(a) to 15(c) are graphs showing correlations between normalized push-pull signal amplitude (amplitude of signal representing the difference between outputs of segments of the two-segment photodetector whose detection plane is split in a direction along a track, divided by the sum of these outputs) and a track pitch, a groove depth and a groove width, respectively.

It is understandable from FIGS. 15(a) to 15(c) that in e.g. a case of recordable Blu-ray disc, the track pitch in the control data region is wider than the track pitch in the user data region, and accordingly, when the groove shapes in the control data region and the user data region are substantially the same, the normalized push-pull signal amplitude obtained from the control data region is larger than the normalized push-pull signal amplitude obtained from the user data region. Further, it is known that the amplitude of normalized push-pull signal changes depending on the groove width and groove depth.

A pickup having an objective lens for converging laser beam follows a track based on the normalized push-pull signal (hereinafter operation of following a track is referred to as "tracking", and control for performing tracking is referred to as "tracking servo".). A pickup is usually designed on the assumption that a normalized push-pull signal amplitude is within a predetermined range. In other words, it is necessary that the normalized push-pull signal amplitude is within a predetermined range in order to realize stable tracking servo.

For example, when the normalized push-pull signal amplitude is smaller than the predetermined range, sufficient signal amplitude for realizing stable tracking servo can not be obtained, and there occurs a problem of tracking servo error.

Further, for example, when the normalized push-pull signal amplitude is larger than the predetermined range, too high signal amplitude is input into a tracking servo circuit, and as a result, there occurs a problem that the servo system oscillates.

Further, when the normalized push-pull signal amplitude is relatively too large, a focus error signal to be used for focus servo overlaps with a push-pull signal (a differential signal of outputs of segments of two-segment photodetector whose detection plane is split in a direction along a track), which may cause a problem such as focusing error.

Here, some type of pickup uses a signal other than a normalized push-pull signal to carry out tracking, but it is common even to such a pickup that the signal amplitude used for carrying out tracking is required to be within a predetermined range to realize stable tracking servo.

Further, even when the normalized push-pull signal amplitude is within a predetermined range, if quick change of normalized push-pull signal amplitude occurs, a gain control circuit for servo system can not follow the change, and tracking servo error may be caused. Accordingly, it is advantageous to reduce change of the normalized push-pull signal amplitude as much as possible in order to reduce the possibility of occurrence of trouble of tracking servo.

As described above, since quick change of normalized push-pull signal adversely affects tracking servo or focus servo, for example, it is known to be advantageous to make the groove shapes in the control data region and the user data region different from each other, and thereby reduce the difference between normalized push-pull signal amplitudes in the control data region and the user data region, to prevent such an affect.

Here, according to a common production method of information recording medium, it is possible to make groove shapes of the regions different by making exposure powers of master exposure apparatus for the regions different from one another.

Further, in order to realize stable tracking servo in the regions having different tracking pitches, it is proposed to constitute a single spiral-shaped track by regions having different track pitches, and to provide a transition section in which the track pitch gradually changes (Patent Document 1).

The above technique of providing a transition section in which track pitch gradually changes, is used, for example, in a recordable Blu-ray disc. According to this technique, a control data region and a user data region form a continuous spiral-shaped track, and these regions are connected by interposing a track pitch transition section Stp in which track pitch gradually changes.

Arrangement of the control data region, the user data region and the track pitch transition section Stp in a recordable Blu-ray disc is described with reference to FIG. 16. Here, FIG. 16 is a view for explaining arrangement of the control data region, the user data region and the track pitch transition section Stp in a common recordable Blu-ray disc.

As shown in FIG. 16, in a recordable Blu-ray disc, a control data region is arranged more inside from a user data region, and the track pitch in the control data region is set to be about 0.35 μm, and the track pitch in the user data region is set to be about 0.32 μm.

Further, between the user data region and the control data region, a protection zone is provided, and the track pitch transition section Stp is formed so as to be completely contained in the protection zone.

The track pitch in the protection zone (inner peripheral side protection zone in FIG. 16) present more inside from the track pitch transition section Stp, is set to be the same as the track pitch in the control data region.

On the other hand, the track pitch in a protection zone (outer peripheral side protection zone in FIG. 16) present more outside from the track pitch transition section Stp, is set to be the same as the track pitch of the user data region.

Further, the wobble modulation methods in the control data region and the user region are different, and the wobble modulation method in the protection zone is the same as the wobble modulation method in the user data region. Namely, the wobble modulation method changes at a border between the protection zone and the control data region (Patent Document 2).

Namely, the protection zone is a zone that is provided between two regions between which the wobble modulation method and track pitch are different, and provided for connecting the two regions formed in a single spiral-shaped track.

Patent Document 1: JP-A-2003-346384
Patent Document 2: JP-A-2006-12355

DISCLOSURE OF THE INVENTION

Problems to be Solved by the Invention

Problems to be solved by the invention are described using a Blu-ray disc as an example.

As described above, in a Blu-ray disc, the control data region having relatively wide track pitch is provided more inner peripheral side from the user data region. These regions are provided in a continuous track, and between these regions, a track pitch transition section Stp in which the track pitch gradually changes is provided.

Further, in order to reduce the difference between normalized-push-pull signals of control data region and user data region, it is possible to make the groove shapes of these recording regions different from each other by setting exposure powers of a master exposing apparatus for these regions differently.

However, when the groove shapes of these recording regions are different, discontinuity of normalized push-pull signal amplitude occurs at a connecting point between different groove shapes, and there occurs such a problem that a normalized push-pull signal amplitude sufficient for operation of a drive is not obtained or that a large normalized push-pull signal amplitude causing tracking servo error or focus servo error is obtained.

Further, due to discontinuity of normalized push-pull signal amplitude, the gain control circuit for tracking servo system cannot follow, and there occurs a problem of tracking servo error.

Such a problem is significant in an in-groove type Low-To-High recordable Blu-ray disc having a recording layer containing an organic pigment material. Here, an in-groove type means a type of Blu-ray disc using a groove bottom portion, that is on far side of a concave-convex pattern from the recording medium surface on which read-write light is incident, as a recording track. Further, the Low-To-High recordable Blu-ray disc means a Blu-ray disc configured so that the reflectivity of a recording mark portion is higher than the reflectivity of no-recorded portion.

In an in-groove type Low-To-High recordable Blu-ray disc, in order to obtain sufficient read-write characteristic for practical use in the user data region, it is desired to make the normalized push-pull signal amplitude before recording to be large to a certain extent. For this reason, in the state before recording, the difference between normalized push-pull signal amplitudes in the control data region and the user data region becomes large, and a problem such as tracking servo error due to discontinuity of normalized push-pull signal amplitude at the connecting portion of these regions, is considered to occur more frequently.

The present invention has been made to the above problems. Namely, it is an object of the present invention to provide an information recording medium having a plurality of recording regions having different track pitches and groove shapes, which can realize stable focus servo and tracking servo, and to provide a master exposing apparatus capable of producing such an information recording medium.

Means for Solving the Problems

The present inventors have made extensive studies to solve the above problems, and discovered that in an information recording medium having a plurality of recording regions having different track pitches and groove shapes, by providing a transition section having a section in which the track pitch changes and a section in which the groove shape changes, and by making these sections share at least a region thereof, it becomes possible to realize stable focus servo and tracking servo.

Further, they discovered that by providing in a master exposing apparatus, a mechanism for sweeping the intensity of recording light in simple increase or simple decrease manner, or a mechanism for repeatedly carrying out an operation of adjusting the recording light intensity by interpolation in a cycle time of at most 100 msec, it is possible to produce such an information recording medium, to complete the present invention.

Namely, the present invention has the following gists:
(1) An information recording medium having a recording track formed by a concave-convex pattern, wherein the recording track includes a first recording region R1, a second recording region R2 and a recording region transition section Sx arranged between the first recording region R1 and the second recording region R2;

a track pitch tp1, a groove width w1 and a groove depth d1 in the first recording region R1, and a track pitch tp2, a groove width w2 and a groove depth d2 in the second recording region R2 satisfy the following formula (1) and the following formulae (2) and/or (3):

$$0<|tp1-tp2| \quad (1)$$

$$0<|w1-w2| \quad (2)$$

$$0<|d1-d2|; \quad (3)$$

the recording region transition section Sx includes a track pitch transition section Stp in which the track pitch changes from tp1 to tp2 and a groove shape transition section Sg in which the groove width changes from w1 to w2 and/or the groove depth changes from d1 to d2; and the track pitch transition section Stp and the groove shape transition section Sg at least partially overlap to share a region SL.

(2) The information recording medium according to the above (1), wherein the first recording region R1, the second recording region R2 and the recording region transition section Sx are formed by a physically continuous groove.

(3) The information recording medium according to the above (1) or (2), which comprises a recording layer containing an organic pigment.

(4) The information recording medium according to any one of the above (1) to (3), wherein the reflectivity of a recording mark portion is higher than the reflectivity of non-recorded portion.

(5) The information recording medium according to any one of the above (1) to (4), wherein a groove bottom portion, that is on far side of a concave-convex pattern from a surface of the information recording medium in which recording-reproduction light is incident, is used as the recording track.

(6) The information recording medium according to any one of the above (1) to (5), wherein the composition and the film thickness of the recording layer are constant at least among the first recording region R1, the second recording region R2 and the recording region transition section Sx.

(7) The information recording medium according to any one of the above (1) to (6), which is a disc-shaped information recording medium wherein the length Lg of the groove shape transition section Sg along the track is at least the length of one circle of the track in the disc-shaped information recording medium.

(8) The information recording medium according to any one of the above (1) to (7), wherein the groove width and/or the groove depth in the groove shape transition section Sg simply increases or simply decreases along the track.

(9) The information recording medium according to any one of the above (1) to (8), wherein the length Ltp of the track pitch transition section Stp along the track, and the length LL of the region SL shared by the track pitch transition section Stp and the groove shape transition section Sg, satisfy the following formulae (4) and (5):

$$0.2 \leq Lg/Ltp \leq 2.5 \quad (4)$$

$$0.1 \leq LL/Ltp \leq 1.0 \quad (5)$$

(10) The information recording medium according to any one of the above (1) to (9), wherein provided that the maximum value of normalized push-pull signal amplitude in non-recorded state is $NPP_{max}$ and the minimum value of the amplitude is $NPP_{min}$ in the first recording region R1 and the second recording region R2, the normalized push-pull signal amplitude NPP satisfies the following formula in the entire region of the recording region transition section Sx:

$$NPP_{min} \leq NPP \leq NPP_{max} \quad (6)$$

(11) The information recording medium according to any one of the above (1) to (10), wherein provided that the maximum value of the groove portion reflectivity in non-recorded state in the first recording region R1 and the second recording region R2 is $Rgv_{max}$ and its minimum value is $Rgv_{min}$, the groove portion reflectivity Rgv in non-recorded state satisfies the following formula in the entire region of the recording region transition section Sx:

$$Rgv_{min} \leq Rgv \leq Rgv_{max} \quad (7)$$

(12) The information recording medium according to any one of the above (1) to (11), wherein the first recording region R1 is arranged more inside than the second recording region R2, and a third recording region having a track pitch tp3 wider than the track pitch tp1 of the first recording region R1 and the track pitch tp2 of the second recording region R2, is arranged more inside than the first recording region R1.

(13) The information recording medium according to the above (12), wherein no information is recorded by wobble of groove in the third recording region R3.

(14) The information recording medium according to the above (12) or (13), wherein a track pitch transition section Stp' in which the track pitch changes from tp3 to tp1, is provided between the third recording region R3 and the first recording region R1.

(15) The information recording medium according to any one of the above (1) to (14), wherein the first recording region R1 includes a read only region storing a predetermined information, and the second recording region R2 includes readable-writable region in which user data is writable.

(16) The information recording medium according to the above (15), wherein the track pitch in the read only region is 0.35 µm, and the track pitch in the readable-writable region is 0.32 µm.

(17) The information recording medium according to the above (15) or (16), which satisfies a relation:

$$NPPAL_{max}/NPPAL_{min} \leq 3$$

provided that the normalized push-pull signal amplitude in the read only region is NPP1, the normalized push-pull signal amplitude in non-recorded state in the readable-writable region is NPP2, the normalized push-pull signal amplitude after recorded in the readable-writable region is NPP2a, the maximum value among maximum values of these parameters is $NPPAL_{max}$, and the minimum value among the minimum values of these parameters is $NPPAL_{min}$.

(18) The information recording medium according to the above (17) which satisfies a relation:

$$NPPAL_{max}/NPPAL_{min} \leq 2.$$

(19) The information recording medium according to any one of the above (15) to (18), wherein a first wobble modulation method is applied to the read only region, a second wobble modulation method that is different from the first wobble modulation method is applied to the readable-writable region, and the same wobble modulation method as that for the readable-writable region is applied to the recording region transition section Sx.

(20) A master exposing apparatus comprising a recording light source;
a deflection signal generating mechanism for generating a predetermined deflection signal based on a predetermined format;
a recording light deflection mechanism for deflecting recording light generated by the recording light source based on the deflection signal generated by the deflection signal generating mechanism;
a light-converging mechanism for converging the recording light on a master;
a rotating mechanism for placing the master thereon and for rotating the master;
a radial moving mechanism for relatively moving the light-converging mechanism in a radial direction of the master;
a control mechanism for controlling the rotation speed of the rotating mechanism, the moving speed of the radial moving mechanism and the position of the light-converging mechanism based on a preset value so as to form a plurality of recording regions having different track pitches;
a recording light intensity adjusting mechanism for adjusting the intensity of the recording light; and
a recording light intensity sweeping mechanism for sweeping the intensity of recording light so as to simply increase or decrease the intensity based on a preset value.

(21) The master exposing apparatus according to the above (20), which comprises a mechanism for detecting arrival of the light-converging mechanism at a preset radial position, and for starting and/or ending the sweep of the intensity of recording signal by the recording signal intensity sweeping mechanism.

(22) The master exposing apparatus according to the above (20), which comprises a mechanism for detecting output of a predetermined address of the deflection signal generating mechanism set in advance, and for starting and/or ending the sweep of the intensity of recording light by the recording light intensity sweeping mechanism.

(23) The master exposing apparatus according to the above (20), which comprises a mechanism for detecting arrival of the light-converging mechanism at a predetermined radial position set in advance, starting the sweep of recording light intensity by the recording light intensity sweeping mechanism, and for ending the sweep after a lapse of predetermined time set in advance.

(24) The master exposing apparatus according to the above (20), which comprises a mechanism for detecting output of a predetermined address by the deflection signal producing mechanism set in advance, starting the sweep of recording light intensity by the recording light intensity sweeping mechanism, and for ending the sweep after a lapse of predetermined time set in advance.

(25) A master exposing apparatus comprising a recording light source;
a deflection signal generating mechanism for generating a predetermined deflection signal based on a predetermined format;
a recording light deflection mechanism for deflecting recording light generated by the recording light source based on the deflection signal generated by the deflection signal generating mechanism;
a light-converging mechanism for converging the recording light on a master;
a rotating mechanism for placing the master thereon and for rotating the master;
a radial moving mechanism for relatively moving the light-converging mechanism in a radial direction of the master;
a control mechanism for controlling the rotation speed of the rotating mechanism, the moving speed of the radial moving mechanism and the position of the light-converging mechanism based on a preset value so as to form a plurality of recording regions having different track pitches;
a recording light intensity adjusting mechanism for adjusting recording light intensity by interpolation based on the position of the light-converging mechanism and a preset value of recording signal intensity at a predetermined radial value; and
a repeating operation mechanism for repeating the recording light intensity adjusting operation;
wherein the operation time required for one cycle of the repeating operation mechanism is at most 100 msec.

EFFECTS OF THE INVENTION

The information recording medium of the present invention has a plurality of recording regions having different track pitches and groove shapes, and the information recording medium can realize stable focus servo and tracking servo.

Further, the master exposing apparatus of the present invention can produce the above information medium efficiently.

Figure 1A:
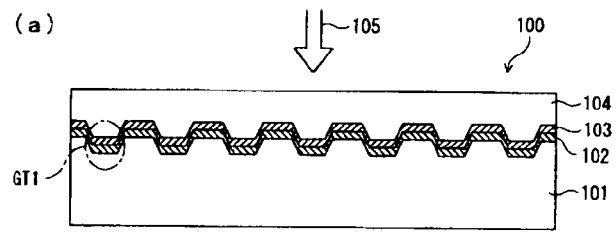
FIGS. 1(a) and 1(b) are schematic partial cross sectional views each showing the layer structure of an information recording medium of the present invention.

EXPLANATION OF NUMERALS 100, 200: Information recording medium
101, 201: Substrate
102: Reflective layer
103: Recording layer
104, 207: Cover layer
105, 208: Laser beam
202: First reflective layer
203: First recording layer
204: Intermediate layer
205: Second reflective layer
206: Second recording layer
300: Recordable Blu-ray disc
301: BCA region
302: PIC region
303: User data region
501: Substrate for master
502: Photoresist
503: Master
503': Concave-convex master
504: Pattern
505: Conductive layer
506: Father layer (father stamper, father)
507: Separation layer
508: Mother layer (mother stamper, mother)
600: Master exposing apparatus
601: Formatter (deflection signal generating mechanism)
602: Laser light source (recording light source)
603: Power-adjusting element (recording light intensity adjusting mechanism)
604: EOD element (recording light deflecting mechanism)
605: Objective lens (light-converging mechanism)
606: Turntable (rotating mechanism)
607: Slider (radially moving mechanism)
608: Mirror
609: Controller (controlling mechanism)
900: Information reproduction apparatus for evaluation
901: Four-segment photodiode
902: Push-pull signal-generating circuit
903: Sum signal generating circuit
904: Normalized push-pull signal-generating circuit
905: Synthetic circuit
906: Information recording medium for evaluation

BEST MODE FOR CARRYING OUT THE INVENTION

Now, best modes (hereinafter referred to as "embodiment of the present invention") for carrying out the present invention are described with reference to drawings.

However, the present invention is not limited to the following embodiments of the invention, and the present invention can be carried out with various modifications within the gist of the present invention.

Here, the present invention is suitably applicable to an in-groove type Low-To-High recordable Blu-ray disc, and accordingly, the present invention is described appropriately by using an in-groove type Low-To-High recordable Blu-ray disc as an example of information recording medium. However, application of the present invention is not limited to a particular information recording medium, but it is applicable to various types of information recording media (such as an on-groove type recordable Blu-ray disc or information recording media such as DVD (digital Versatile Disc) other than Blu-ray disc).

I. Information Recording Medium

I-1. Basic Construction

The information recording medium of the present invention is an information recording medium having a recording track constituted by a concave-convex pattern, which usually comprises a disc-shaped substrate and a recording layer formed on the substrate.

The substrate may be appropriately made of a known material, but the material preferably has a shape stability so that the information recording medium has a certain extent of rigidity. Namely, the material preferably has high mechanical stability and high rigidity.

Such a material may, for example, be a resin such as an acrylic resin, a methacrylic resin, a polycarbonate resin, a polyolefin resin (particularly amorphous polyolefin), a polyester resin, a polystyrene resin or an epoxy resin, or a glass. These materials may be used alone or two or more types of them may be optionally combined at an optional ratio for use. Among these, from the viewpoints of high productivity such as moldability, cost, low-moisture-absorbing property or shape stability, polycarbonate is preferred as the material of substrate.

The thickness of the substrate is usually preferably at least 0.5 mm and at most 1.2 mm.

The recording layer may be appropriately made of a known material whose physical property or shape etc. changes according to irradiation of laser beam and which enables recording and reproduction of an information by change of optical characteristic such as reflectivity. Such a material may, for example, be an organic pigment material or an inorganic material such as a phase change material.

The organic pigment material may, for example, be a macrocyclic azaannulene pigment (phthalocyanine pigment, naphthalocyanine pigment, porphyrin pigment, etc.), a pyrromethene pigment, a polymethine pigment (cyanine pigment, merocyanine pigment, squarylium pigment, etc.), an anthraquinone pigment, an azurenium pigment, a metal-containing azo pigment, or a metal-containing indoaniline pigment.

The organic pigment may, for example, be a chalcogen alloy film such as GeTe or GeSbTe; a double layer film such as Si/Ge or Al/Sb; a (partial) nitride film such as BiGeN or SnNbN; or a (partial) oxide film such as $TeO_x$ or $BiFO_x$. These materials may be used alone or at least two types of them may be used in combination at an optional ratio.

The film thickness of the recording layer is usually at least 1 nm and usually at most 100 nm, preferably from 10 to 90 nm.

Here, the composition and the film thickness of the recording layer of the first recording region R1 are preferably at least the same as those of the second recording region R2 and the recording region transition section Sx. However, inevitable unevenness of the composition and the film thickness of the recording layer due to production process or groove shape, are allowable. Namely, for example, in a case of coating an organic pigment material by using a common spin-coating method to form a recording layer, the film thickness of the recording layer may change between regions having different groove shapes or between inside and outside regions of a disc, but such a difference is allowable so long as it is within a range capable of achieving stable focus servo and tracking servo.

Further, the information recording medium of the present invention is preferably applied to an in-groove type Low-To-High recordable Blu-ray disc. Namely, the composition and the film thickness of the recording layer are preferably configured so that the reflectivity of a recording mark portion is higher than the reflectivity of non-recorded portion. This is because, as described above, an in-groove type Low-To-High recordable Blu-ray disc tends to have a problem such as tracking servo error due to discontinuity of normalized push-pull signal amplitude. However, the information recording medium of the present invention may be applied to e.g. a High-To-Low recordable Blu-ray disc, and the composition or the film thickness of the recording layer is optionally selectable.

Further, in the information recording medium of the present invention, it is possible to record data in the recording layer or to reproduce the data recorded in the recording layer by irradiating the recording layer with a laser beam for recording or reproduction by using a known recording and/or reproducing apparatus.

Here, the information recording medium of the present invention may have other layers. Such other layers include a reflective layer, a cover layer, an intermediate layer or an interface layer.

The reflective layer is required to have at least a certain reflectivity for laser beam used for recording and reproduction, and it is appropriately made of a known material. Such a material may, for example, be a metal such as Al, Ag or Au or an alloy of these metals. These metals may be used alone or at least two types of them may be used in combination at an optional ratio.

The film thickness of the reflective layer is usually at least 3 nm, and usually at most 400 nm, preferably from 50 to 300 nm.

The cover layer is made of a material transparent and low birefringence for laser beam used for recording and reproduction. Usually, it is formed by laminating a plastic plate (it is called as a sheet) with an adhesive agent, or by applying a solution of cover layer followed by curing it by light, radiation rays or heat etc. These materials may be used alone or at least two types of them may be used in combination at an optional ratio. The film thickness of the cover layer is usually at least 10 μm and usually at most 300 μm, preferably from 50 to 150 μm. In a Blu-ray disc, usually the film thickness of cover layer is about 100 μm, preferably from 97 to 103 μm.

The intermediate layer is mainly employed in a lamination type information recording medium having a plurality of recording layers. The intermediate layer needs to have a certain degree of light transmittance for laser beam used for recording and reproduction, and it is necessary that a groove or pits can be formed by deformation of the intermediate layer.

The material of the intermediate layer may, for example, be a resin material such as a thermoplastic resin, a thermosetting resin, an electron beam curable resin or a UV-curable resin (including a delay curing type). These materials may be used alone or at least two types of them may be used in combination at an optional ratio.

The film thickness of the intermediate layer is usually at least 5 μm and usually at most 100 μm, preferably from 10 to 70 μm.

The interface layer is provided e.g. at an interface between the recording layer and the cover layer or an interface between the recording layer and the reflective layer, and the interface layer has a function of preventing diffusion of mutual layers or adjusting optical properties.

The film thickness of the interface layer is usually at least 1 nm and usually at most 50 nm, preferably from 3 to 15 nm.

The number, the combination and the order of lamination etc. of these layers in the information recording medium of the present invention are not limited and optional.

An example of specific layer construction of the information recording medium of the present invention is described with reference to FIGS. 1(a) and 1(b). Here, FIGS. 1(a) and 1(b) are each a schematic partial cross sectional view showing an example of layer construction of the information recording medium of the present invention.

Specifically, an information recording medium 100 shown in FIG. 1(a) is an example of single layer type information recording medium, wherein a substrate 101, a reflective layer 102, a recording layer 103 and a cover layer 104 are laminated in this order. Further, by irradiating the recording layer 103 with a laser beam 105 for recording and reproduction from the cover layer 104 side, it is possible to record a data in the recording layer 103 or to reproduce a data recorded in the recording layer 103.

Figure 1B:
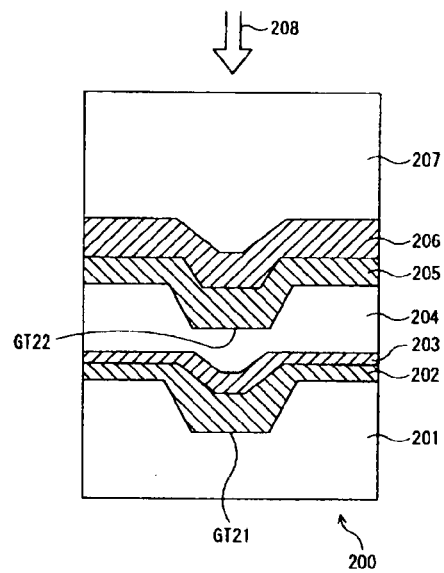

Further, the information recording medium 102 shown in FIG. 1(b) is a double-layer type information recording medium, wherein a substrate 201, a first reflective layer 202, a first recording layer 203, an intermediate layer 204, a second reflective layer 205, a second recording layer 206 and a cover layer 207 are laminated in this order. Further, by irradiating the first recording layer 203 or the second recording layer 206 with a laser beam 208 for recording or reproduction from the cover layer 207 side, it is possible to record a data in the first recording layer 203 or the second recording layer 206, or to reproduce the data recorded in the first recording layer 203 or the second recording layer 206.

Hereinafter, explanation may be made using the layer constructions shown in FIGS. 1(a) and 1(b) as examples, but the layer constructions shown in FIGS. 1(a) and 1(b) are examples of the layer construction of the information recording medium of the present invention. The information recording medium of the present invention is not limited to these layer constructions, and it may have different layer construction. For example, in the layer constructions shown in FIGS. 1(a) and 1(b), it is possible to delete a part of layers, add another layer, unify two or more layers into a single layer, change the order of lamination, provide three or more recording layers, or add an optional modification.

The information recording medium of the present invention has a spiral-shaped track constituted by a concave-convex pattern formed on any one of the layers (usually on the substrate or the intermediate layer, etc.). By irradiating the recording layer with a laser beam for recording based on the track, data is recorded along the track. Further, by irradiating the recording layer with a laser beam for reproduction based on the track, it is possible to reproduce the data recorded along the track.

Specifically, in a single-layer type information recording medium shown in FIG. 1(a), a track (groove track) GT1 is formed on a substrate 101, and a reflective layer 102, a recording layer 103 and a cover layer 104 are laminated on the track.

Further, in a double-layer type information recording medium shown in FIG. 1(b), a track (groove track) GT21 is formed on a substrate 201, and a first reflective layer 202, a first recording layer 203 and an intermediate layer 204 are laminated on the track. Further, on a surface of the intermediate layer 204 on an opposite side from the recording layer 203, a track (groove track) GT22 is formed, and a second reflective layer 205, a second recording layer 206 and a cover layer 207 are laminated on the track.

In the following descriptions, explanation is made by using a case where a track is formed on a substrate or an intermediate layer as shown in FIG. 1(a) or 1(b) as a rule. However, in the information recording medium of the present invention, the layer on which a track is formed is not limited to the substrate or the intermediate layer.

Further, the track may be constituted by a concave portion, a convex portion, or both the convex portion and the concave portion of a concave-convex pattern when it is observed from a laser beam incident side. Here, particularly in an information recording medium of film surface incident type having an organic pigment material as a recording layer, the track is preferably constituted by a concave portion of a concave-convex pattern when it is observed from the laser beam incident side. Such a track constituted by a concave portion of a concave-convex pattern when it is observed from laser beam incident side, is hereinafter referred to as "groove track". Tracks GT1, GT21 and GT22 shown in FIGS. 1(a) and 1(b) are all groove tracks.

In the following descriptions, a groove track constituted by a groove (concave portion) of e.g. a substrate or an intermediate layer shown in FIGS. 1(a) or 1(b) is used for explanation unless otherwise specified, but the track of the information recording medium of the present invention is not limited to a groove track.

Further, in a case where a track is constituted by groove, the cross sectional shape (cross sectional shape in the thickness direction of information recording medium) of the groove is not limited and is optional. For example, it may be rectangular, trapezoidal, semicircular, semielliptical, etc.

Here, in the present invention, the width of groove forming a track is defined as "groove width". Here, when the width of a groove constituting a track differs according to the position in the thickness direction of the information recording medium, for example, when the cross sectional shape of track is trapezoidal, the width of the groove at a half position of the maximum depth may be defined as "groove width".

Further, in the present invention, the depth of groove constituting a track is defined as "groove depth". Here, when the depth of groove constituting a track changes depending on the radial position in the information recording medium (for example, when the cross sectional shape of the groove is semicircular), the maximum depth may be defined as "groove depth".

Here, the shape of groove constituting the track is mainly defined by these "groove width" and "groove depth". In the following descriptions, the groove width and/or groove depth of an information recording medium may be referred to as a general term "groove shape".

I-2. Recording Region and Recording Region Transition Section Sx

Next, the relation among a first recording region R1, a second recording region R2 and a recording region transition section Sx contained in a recording track of an information recording medium of the present invention, is described with reference to FIG. 2. Here, FIG. 2 is a view for explaining the relation among the first recording region R1, the second recording region R2 and the recording region transition section Sx in the information recording medium of the present invention, and the view schematically shows an example of cross sectional shapes of two adjacent grooves in each of the first recording region R1, the second recording region R2 and the recording region transition section Sx.

Figure 2:
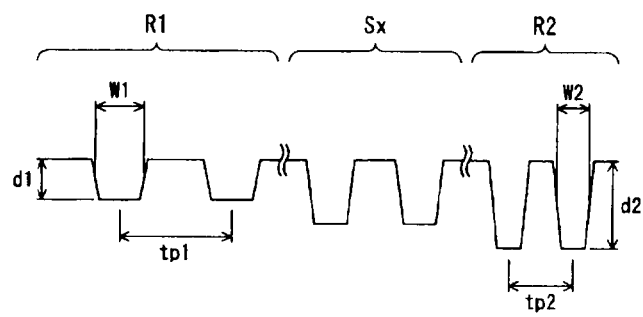
FIG. 2 is a view showing the relation among a first recording region R1, a second recording region R2 and a recording region transition section Sx in the information recording medium of the present invention. The figure schematically shows cross sectional shapes of two adjacent grooves in each of the first recording region R1, the second recording region R2 and the recording region transition section Sx.

A recording track of the information recording medium of the present invention has at least a first recording region R1 and a second recording region R2 as shown in FIG. 2.

In the recording track of the information recording medium of the present invention, a track pitch tp1, a groove width w1 and a groove depth d1 in the first recording region R1, and a track pitch tp2, a groove width w2 and a groove depth d2 in the second recording region R2, satisfy the following formula (1) and the following formula (2) and/or formula (3).

$$0<|tp1-tp2| \quad (1)$$

$$0<|w1-w2| \quad (2)$$

$$0<|d1-d2| \quad (3)$$

Formula (1) shows that the track pitch tp1 in the first recording region R1 and the track pitch tp2 in the second recording region R2 have different values from each other.

Further, formula (2) shows that the groove width w1 in the first recording region R1 and the groove width w2 in the second recording region R2 have different values from each other.

Further, formula (3) shows that the groove depth d1 in the first recording region R1 and the groove depth d2 in the second recording region R2 have different values from each other.

Here, it is sufficient that either one of the formulae (2) and (3) is satisfied and it is also sufficient that both of them are satisfied.

Namely, it is sufficient that the groove width w1 in the first recording region R1 is different from the groove width w2 in the second recording region R2 and that the groove depth d1 in the first recording region R1 is different from the groove depth d2 in the second recording region R2. Further, it is also sufficient that the groove width w1 in the first recording region R1 is different from the groove width w2 in the second recording region R2 while the groove depth d1 in the first recording region R1 is the same as the groove depth d2 in the second recording region R2. Further, it is also sufficient that the groove width w1 in the first recording region R1 is the same as the groove width w2 in the second recording region R2 while the groove depth d1 in the first recording region R1 is different from the groove depth d2 in the second recording region R2.

FIG. 2 shows a case where the groove width w1 in the first recording region R1 is different from the groove width w2 in the second recording region R2 and that the groove depth d1 in the first recording region R1 is different from the groove depth d2 in the second recording region R2, but the present invention is not limited thereto.

Here, the track pitch tp1, the groove width w1 and the groove depth d1 in the first recording region R1 and the track pitch tp2, the groove width w2 and the groove depth d2 in the second recording region R2 are each usually substantially constant within the entire region of the respective recording regions R1 and R2.

Further, as shown in FIG. 2, the information recording medium of the present invention has a recording region transition section Sx arranged between the first recording region R1 and the second recording region R2. Namely, the first recording region R1 and the second recording region R2 are physically isolated, and between the first recording region R1 and the second recording region R2, the recording region transition section Sx is arranged.

This recording region transition section Sx includes a track pitch transition section Stp in which the track pitch changes from tp1 to tp2, and a groove shape transition section Sg in which the groove width changes from w1 to w2 and/or the groove depth changes from d1 to d2.

Here, the track pitch transition section Stp is a region that is present between the recording regions R1 and R2 and wherein the track pitch gradually changes from tp1 to tp2 when the information recording medium is observed along the track.

Further, the groove shape transition section Sg is, in the same manner as the track pitch transition section Stp, a region that is present between the recording regions R1 and R2 and wherein the groove shape gradually changes from w1 to w2 and/or the groove depth gradually changes from d1 to d2 when the information recording medium is observed along the track.

Namely, when the groove width w1 in the first recording region R1 is the same as the groove width w2 in the second recording region R2, the groove width does not change in the groove shape transition section Sg, w1 is the same as w2 and only the groove depth gradually changes from d1 to d2. Further, when the groove depth d1 in the first recording region R1 is the same as the groove depth d2 in the second recording region R2, the groove depth does not change in the groove shape transition section Sg, d1 is the same as d2 and only the groove width gradually changes from w1 to w2.

Further, these track pitch transition section Stp and groove shape transition section Sg at least partially overlap to share a region SL.

Here, with respect to the relation among the recording region transition section Sx, the track pitch transition section Stp and the groove shape transition section Sg, for example, the following embodiments (1) to (3) are considered.

(1) The track pitch transition section Stp completely agrees with the groove shape transition section Sg and these sections share entire region as the region SL. In this case, the recording region transition section Sx agrees with each of these sections.

(2) The track pitch transition section Stp and the groove shape transition section Sg partially overlaps to share a region SL, and each of these sections has non-shared region. In this case, the recording region transition section Sx means a region constituted by the shared region SL and the respective no-shared regions.

(3) The track pitch transition section Stp and the groove shape transition section Sg, whichever wider completely includes the other (narrower) recording region. In this case, the share region SL corresponds to the entire narrower recording region, and the recording region transition section Sx agrees with the wider region of these regions.

Here, it is important that the track pitch transition section Stp and the groove shape transition section Sg at least partially overlaps to share a region SL. Namely, an embodiment in which these regions are completely isolated is not included in the present invention.

Here, FIG. 2 shows the cross sectional shape of groove in the region SL that is shared by the track pitch transition section Stp and the groove shape transition section Sg, as the cross sectional shape of groove in the recording region transition section Sx for clarification. Namely, FIG. 2 schematically shows a case where the track pitch is between tp1 and tp2, the groove width is between w1 and w2 and the groove depth is between d1 and d2. As described above, the cross sectional groove shape in the recording region transition section Sx is not limited thereto.

Here, the groove shape means a geometric shape of each groove in a cross section perpendicular to a recording medium that is represented by groove width or groove shape, and does not mean wobble of groove itself in radial direction changed by a wobble-modulation method. Accordingly, the transition of groove shape does not mean transition of wobble amount of the groove itself in radial direction, but the groove shape and the wobble amount can be controlled independently. Here, change of wobble-modulation method or change of wobble amount of groove itself in radial direction in the groove shape transition section Sg are not prohibited. So long as there is no problem in the properties of medium, the wobble-modulation method may be changed e.g. in the groove shape transition section Sg.

Further, in order to avoid quick change of groove shape, the length Lg of the groove shape transition section Sg along the track is preferably at least a full circle of track in a disc-shaped information recording medium.

Further, state of change of track pitch in the track pitch transition section Stp, is preferably such that the track pitch simply increases or decreases along a track for the purpose of preventing quick change of normalized push-pull signal amplitude.

Further, in the track pitch transition section Stp, the track pitch preferably changes continuously. However, the change of track pitch may be discontinuous so long as the change of normalized push-pull signal amplitude is suppressed to a level causing no problem in practical use.

Further, the state of change of groove shape in the groove shape transition section Sg is preferably such that the groove width and/or the groove depth simply increases or decreases along a track for the purpose of preventing quick change of normalized push-pull signal amplitude.

Further, in the groove shape transition section Sg, the groove shape preferably changes continuously. However, the change of groove shape may be discontinuous so long as the change of normalized push-pull signal amplitude is suppressed to a level causing no problem in practical use.

Namely, by making the groove shape simply increase or decrease as described above, a groove portion reflectivity Rgv in non-recorded region will become likely to satisfy in the entire region of the recording region transition section Sx a relation:

$$Rgv_{min} \leq Rgv \leq Rgv_{max}$$

where $Rgv_{max}$ is the maximum value and $Rgv_{min}$ is the minimum value of groove portion reflectivity in non-recorded state in the recording regions R1 and R2. When the groove portion reflectivity Rgv in non-recorded state satisfy the above formula in the entire region in the transition region transition section Sx, it is securely possible to suppress change of normalized push-pull signal amplitude.

Further, a length Ltp of the track pitch transition section Stp along a track and a length Lg of the groove shape transition section Sg along the track are preferably selected so that the ratio Lg/Ltp becomes usually at least 0.2, preferably at least 0.4, more preferably at least 0.6, and usually at most 2.5.

Further, provided that the length of the region SL that is shared by the track pitch transition section Stp and the groove shape transition section Sg along a track is LL, the values of LL and Ltp are preferably selected so that a ratio LL/Ltp between LL and Ltp becomes usually at least 0.1, preferably at least 0.2 and usually at most 1.0.

By selecting the values of Lg, Ltp and LL within the above ranges, it is possible to suppress quick change of normalized push-pull signal amplitude. Further, in the entire region of the recording region transition section Sx present between the recording regions R1 and R2, it is possible to make the normalized push-pull signal amplitude within a predetermined range and to realize stable focus servo and tracking servo.

Here, the predetermined range means a range wherein sufficiently good focus servo characteristic and tracking servo characteristic can be realized by simply making fine adjustment of a focus servo circuit and tracking servo circuit when such an adjustment is required.

Namely, by selecting the values of Lg, Ltp and LL within the above ranges, in the entire region of the recording region transition section Sx, a normalized push-pull signal amplitude NPP becomes likely to always satisfy the following formula (6):

$$NPP_{min} \leq NPP \leq NPP_{max} \quad (6)$$

where $NPP_{max}$ is the maximum value of normalized push-pull signal amplitude and $NPP_{min}$ is the minimum value of normalized push-pull signal amplitude in no-recorded state in the recording regions R1 and R2.

Namely, it is possible to make the normalized push-pull signal amplitude in the recording region transition section Sx always within the range of normalized push-pull signal amplitude in the recording regions R1 and R2. Accordingly, without making major adjustment of focus servo circuit and tracking servo circuit, it is possible to realize stable focus servo and tracking servo states, such being preferred.

The present inventors assume the reason why stable focus servo and tracking servo can be achieved, to be as follows.

Namely, by gradually changing track pitch in a boarder portion between the two recording regions R1 and R2 having different track pitches, namely, by providing a track pitch transition section Stp, quick change of normalized push-pull signal amplitude caused by the difference of track pitches can be suppressed.

Further, by appropriately changing groove shapes in two recording regions R1 and R2 having different track pitches, it becomes possible to reduce the difference between the normalized push-pull signal amplitudes in these recording regions R1 and R2, and it is possible to realize stable focus servo and tracking servo states.

However, if the groove shape quickly changes in a border portion between the two recording regions R1 and R2 having different groove shapes, the normalized push-pull signal amplitude also quickly changes, and it adversely affects focus servo and tracking servo.

To cope with these problems, in the present invention, by providing the groove shape transition section Sg and the track pitch transition section Stp so that they at least partially overlap to share a region, it is possible to suppress quick change of normalized push-pull signal amplitude caused by the above change of groove shape.

It is sufficient that the information recording medium of the present invention at least has one set of the combination of the first recording region R1, the second recording region R2 and the recording region transition section Sx, but the information recording medium may have two or more sets of them. Thus, when the information recording medium has two or more sets of the combination of the first recording region R1, the second recording region R2 and the recording region transition section Sx, a first recording region R1 in one combination may be a second recording region R2 in another combination.

Further, in the information recording medium of the present invention, it is preferred that the first recording region R1, the second recording region R2 and the recording region transition section Sx are all constituted by a physically continuous groove. The physically continuous groove means a groove having no discontinuation at any position when the groove is observed along a track from inner periphery to the outer periphery. However, the groove may be discontinuous so long as the discontinuation is in a degree that it does not affect normalized push-pull signal amplitude and recording/reproduction properties, and the construction of groove can be optionally selected.

Further, when the information recording medium of the present invention has a disc shape, either one of the first recording region R1 and the second recording region R2 may be present in the inner peripheral side and the other one may be present in the outer peripheral side. Usually, among two recording regions satisfying the relation between the first and second recording regions R1 and R2, a recording region present in the inner peripheral side of the disc is designated as a first recording region R1 and a recording region present in the outer peripheral side of the disc is designated as a second recording region R2.

Here, in the inner peripheral side of the first recording region, a third recording region R3 may be provided which has a track pitch tp3 wider than any one of track pitch tp1 in the first recording region R1 and the track pitch tp2 in the second recording region R2. In the third recording region R3, it is not necessary that an information is recorded by wobble of groove.

Further, between the third recording region R3 and the first recording region R1, a track pitch transition section Stp' in which the track pitch changes from tp3 to tp1 may be arranged.

Examples of these embodiments that are applied to a recording type Blu-ray disc are described in detail below.

I-3. Example of Application to Recording Type Blu-Ray Disc

Next, the construction of information recording medium of the present invention that is applied to a recording type Blu-ray disc, is described with reference to FIG. 3. Here, FIG. 3 is a schematic top view showing arrangement of recording regions in a recordable Blu-ray disc as an example of the information recording medium of the present invention.

Figure 3:
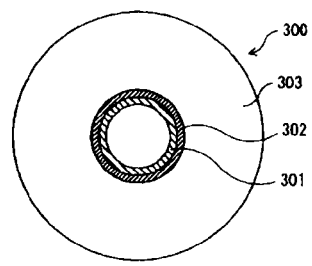
FIG. 3 is a top view schematically showing the arrangement of the recording regions of a recordable Blu-ray disc as an example of information recording medium of the present invention.

A recordable Blu-ray disc 300 shown in FIG. 3 has three recording regions having different track pitches.

First, in the inner most periphery of the disc, a BCA (Burst Cutting Area) region 301 is formed. The track pitch in the BCA region 301 is approximately 2.0 µm, and the region is formed between radial values of about 21 mm and about 22.2 mm from the disc center. In the BCA region 301, low density recording of barcode shape is made, and various types of property information of the information recording medium are stored. In the BCA region, usually no recording of information by wobble of groove is made.

In the outside of the BCA region 301, a PIC (Permanent Information and Control data) region (it may be referred to also as "control data region") 302 is formed. In the PIC region 302, the track pitch is approximately 0.35 µm, and the region is formed between radial values of about 22.2 mm and about 23.2 mm from the disc center. In the PIC region 302, for example, e.g. optimum recording power or media manufacturer information are stored, and this region is used as read only region.

Outside the PIC region 302, a user data region 303 is formed. In the user data region 303, the track pitch is approximately 0.32 µm, and the region is formed between the radial values of about 23.2 mm and about 58.5 mm from the disc center. In the user data region 303, writing of data is possible, and the written data is readable.

Here, in the PIC region 302 and the user data region 303, their groove shapes are adjusted so as to obtain respective predetermined normalized push-pull signal amplitudes.

In the PIC region 302, the groove width is preferably at least 0.01 µm, more preferably at least 0.07 µm, and preferably at most 0.25 µm, more preferably at most 0.13 µm. In the PIC region 302, the groove depth is preferably at least 10 nm, more preferably at least 20 nm, and preferably at most 50 nm, more preferably at most 40 nm.

In the user data region 303, the groove width is preferably at least 0.10 µm, more preferably at least 0.17 µm, and preferably at most 0.28 µm, more preferably at most 0.21 µm. In the user data region 303, the groove depth is preferably at least 20 nm, more preferably at least 30 nm, and preferably at most 70 nm, more preferably at most 60 nm.

Here, in order to connect the PIC region 302 and the user data region 303, a protection region (not shown) is preferably provided between these regions 302 and 303.

Here, it is preferred that the first recording region R1 includes the PIC region being a read only region storing a predetermined information, and that the second recording region R2 includes a user data region being a readable and writable region in which user data can be written. In this embodiment, the recording region transition section Sx is completely included in the protection region. Namely, the track pitch and groove shape in the PIC region change in the protection region to be the track pitch and groove shape of the user data region.

The groove shapes of the first recording region R1 and the second recording region R2, that are, the groove widths w1 and w2 and groove depths d1 and d2 are appropriately selected as described above depending on recording/reproduction properties required for an information recording medium or on production process of the information recording medium. Here, for example in a Blu-ray disc, track pitches in the PIC region and the user data region are different, and in order to reduce the difference of normalized push-pull signal amplitude between these regions due to the difference of track pitches of these regions, it is preferred not only to make the groove widths different but also to make the groove depth different in terms of production process. The reason is as follows. Namely, in order to make the normalized push-pull signal amplitude in the PIC region to be the same level as the normalized push-pull signal amplitude in the user data region, the groove width in the PIC region needs to be narrower than the groove width in the user data region. However, in order to achieve this only by narrowing the groove width in the PIC region, the required groove width in the PIC region may become so narrow that it exceeds the limit of resolution of master exposing apparatus and that the groove may not be properly formed. In this case, it is effective to make the groove depth in the PIC region shallower than the groove width in the user data region as well as changing the groove width. Accordingly, rather than producing a medium so that only groove widths in the first recording region R1 and the second recording region R2 are different, it is preferred to produce a medium so that not only the groove widths but also groove depths are different between these regions, in terms of production of information recording medium.

Further, it is preferred that the third recording region R3 includes the BCA region.

It is preferred to adjust the groove shape and the composition and the film thickness of e.g. a recording layer so as to satisfy a relation:

$$NPPAL_{max}/NPPAL_{min} \leq 3$$

where NPP1 is a normalized push-pull signal amplitude in PIC region, NPP2 is a normalized push-pull signal amplitude in non-recorded state in the user data region, NPP2a is a normalized push-pull signal amplitude after recorded in the user data region, $NPPL_{max}$ is the maximum value among respective maximum values, and $NPPL_{min}$ is the minimum value among the respective minimum values. Namely, both before and after recording, it is possible to suppress values of normalized push-pull signal amplitudes in both of the PIC region and the user data region, to be within a predetermined range, and thus, it is possible to realize stable focus servo and tracking servo states.

Particularly, it is more preferable to adjust the groove shape and the composition and the film thickness of e.g. recording layer so as to satisfy a relation:

$$NPPAL_{max}/NPPAL_{min} \leq 2$$

By doing so, it is possible to realize more stable focus servo and tracking servo states.

Further, in a recordable Blu-ray disc 300, all tracks in the BCA region 301, the PIC region 302 and the user data region 303 form a continuous track, and in a border portion between the BCA region 301 and the PIC region 302 and in a border portion between the PIC region 302 and the user data region 303, respective track pitch transition sections Stp are provided (not shown in FIG. 3). In these track pitch transition sections Stp, track pitches continuously change as described above.

In a case of configuring the above recording type Blu-ray disc 300 as the information recording medium of the present invention, in a border portion between the BCA region 301 and the PIC region 302 and/or in a border portion between the PIC region 302 and the user data region 303, the above groove shape transition section Sg is formed so as to at least partially overlap to share a region with the track pitch transition section Stp (namely, the above recording region transition section Sx is provided). By this construction, it is possible to suppress quick change of normalized push-pull signal amplitude, and to realize stable focus servo and tracking servo states.

Here, the recording region transition section Sx and the groove shape transition section Sg may be provided in any one or both of the border portion between the BCA region 301 and the PIC region 302 and the border region between the PIC region 302 and the user data region 303. However, it is preferred to provide the recording region transition section Sx and the groove shape transition section Sg in at least the border region between the PIC region 302 and the user data region 303, whereby the above effect can be significantly obtained.

Here, the wobble modulation method in the control data region is usually different from that in the user data region. Here, it is preferred that the wobble modulation method is constant in the protection region and is the same as the wobble modulation method in the user data region.

Meanwhile, as described above, in the recordable Blu-ray disc of the present invention, the recording region transition section Sx is preferably completely included in the protection region. Namely, in the entire region of the recording region transition section Sx, it is preferred that the wobble modulation method is constant.

I-4. Measurement Method

The groove shape (groove width and groove depth) of an information recording medium can be measured by the following procedure. For example, in a case of information recording medium such as a recordable Blu-ray disc comprising a substrate having a concave-convex pattern corresponding to a groove track formed thereon, a recording layer laminated on the substrate, and a cover layer made of e.g. UV-curable resin and formed on the recording layer, it is possible to directly measure the depth and width of groove of the substrate before laminating the recording layer, by an AFM (Atomic Force Microscope).

Further, in a case of information recording medium in which a cover layer is formed on a recording layer, by separating the cover layer by e.g. a cotter knife so as to expose to the outside the concave-convex pattern on the substrate corresponding to groove track, it is possible to measure the groove shape by using an AFM.

Further, the length Lg of the groove shape transition section Sg of an information recording medium along the track, can be measured by using an AFM in the following procedure.

Specifically, at first, groove shapes at a plurality of portions in the groove shape transition section Sg and its vicinity are measured, and further, radial values of these measurement portions in the information recording medium are measured, to thereby obtain inner peripheral end radial value and outer peripheral end radial value. Then, the number of track circles present in the groove shape transition section is counted, and it is multiplied by a circle length at a radial value at which the groove shape transition section Sg is present, to thereby obtain the length Lg of the groove shape transition section Sg along the track.

Here, in order to obtain the length Lg of the groove shape transition section Sg along a track by the above method, there may be a trouble somecase where high precision measurement of groove shapes at a plurality of portions is required, and further, measurement of radial values of these measurement portions are required. In such a case, the length Lg of a groove shape transition section Sg information along a track may be obtained by measuring the nature of change of reflection light amount in the groove shape transition section Sg by reproducing the information of the information recording medium by an appropriate reproducing apparatus. Namely, when a laser beam is converged by an objective lens on a track on the information recording medium while the information recording medium is placed and rotated on a spindle motor, reflection light amount according to groove shape is obtained. Since the groove shape changes in the groove shape transition section Sg, by looking a correlation between the radial value of the portion on the information recording medium on which the laser beam is converged and change of reflection light amount, it is possible to know the length Lg of the groove shape transition section Sg along the track.

Further, the track pitch of an information recording medium and the length Ltp of the track pitch transition section Stp can be measured by the following procedure.

First of all, in the same manner as the case of groove shape, the track pitch of the information recording medium and the length Ltp of the track pitch transition section Stp can be directly measured by an AFM.

As an alternative, track pitches in the first recording region R1 and the second recording region R2 can be measured by an optical method.

In the first recording region R1 and the second recording region R2 of the information recording medium of the present invention, a large number of groove tracks circles are arranged at constant intervals. In this case, it is commonly known that by irradiating these recording region R1 and recording region R2 with coherent light such as a laser beam, the arranged groove tracks circles function as a diffraction grating to produce diffracted light at an angle corresponding to the track pitch. Further, a shape measurement apparatus using this principle is devised (refer to e.g. JP-A-57-187604). By using this principle, by measuring an angle at which diffracted light appears, it is possible to know the track pitch.

Further, by using this principle, it is possible to measure the length of the track pitch transition section Stp along a track. For example, by scanning a laser beam in a radial direction of an information recording medium and recording positions at which diffracted light appear as well as radial values of points irradiated with the laser beam, it is possible to know the dimension of track pitch transition section Stp in the radial direction. Further, based on the dimension of the track pitch transition section Stp in the radial direction and the average track pitch obtained by track pitches on both sides of the track pitch transition section Stp, it is possible to assume the length of track pitch transition section Stp along a track.

Further, it is also publicly known that the intensity of the above diffracted light changes according to groove shape. Further, by scanning a laser beam in a radial direction of an information recording medium and measuring the position at which diffracted light appears and its intensity at the same time, it is possible to measure the presence of the groove shape transition section Sg and the track pitch transition section Stp.

Here, the above measurements can be carried out by employing e.g. a SEM (Scanning Electron Microscope) besides an AFM.

II. Process for Producing Information Recording Medium

The process for producing the information recording medium of the present invention is not limited but, for example, it is produced by the following process.

In a common process for producing information recording medium, a stamper having a concave-convex pattern that is a complimentary shape of a concave-convex pattern of a track formed on a substrate or on an intermediate layer, and by employing this stamper, a track of concave-convex pattern is formed on the substrate or the intermediate layer. Accordingly, it is possible to produce an information recording medium of the present invention having the above groove shape transition section Sg, by forming the shape of concave-convex pattern of the stamper into a desired shape.

The shape of concave-convex pattern of such a stamper is usually determined at an exposure step of master in the production process of stamper. In order to form a concave-convex pattern of specific shape defined in the present invention, it is effective to use a specific master exposing apparatus.

In the following descriptions, a process for producing a stamper is described first, and then, a process for producing an information recording medium employing such a stamper is described. Thereafter, a master exposing apparatus (master exposing apparatus of the present invention) for obtaining a stamper having a concave-convex pattern of a desired shape is described.

II-1. Production of Stamper

An example of process for producing a stamper for producing the in formation recording medium of the present invention, is described in detail with reference to FIG. 4. Here, FIGS. 4(a) to 4(i) are views showing an example of process for producing a stamper for producing the information recording medium of the present invention. However, the following production process is only an example, and the process for producing a stamper for producing the information recording medium of the present invention is not limited to the following examples.

Figure 4A:
FIGS. 4(a) to 4(i) are views showing an example of production process of a stamper for producing the information recording medium of the present invention.

First, a master 503 comprising a master substrate 501 on which a photoresist is coated is prepared (refer to FIG. 4(a)).

The material of the master substrate 501 is not limited, but usually a glass substrate is employed.

The photoresist 502 may be a common photoresist such as a so-called novolac diazonaphthoquinone type resist or a chemically amplified resist. Further, the photoresist 502 may be a positive resist or a negative resist. Further, one type of these may be used alone or at least two types of them may be used at an optional combination and optional ratio. Here, definitions of positive resist and negative resist will be described later.

The photoresist 502 is usually applied on the master substrate 501 by a spin coating method, and its film thickness is substantially uniform in the entire surface of the master substrate 501. A specific film thickness of the photoresist 502 may be selected according to the shape of concave-convex pattern of an objective stamper, but it is usually at least 10 nm and usually at most 100 nm.

Figure 4B:

Next, by employing a master exposing apparatus, the master 503 is subjected to an exposure treatment to form a latent image of a predetermined pattern 504 corresponding to a concave-convex pattern corresponding to an objective track is formed on the photoresist 502 on the master substrate 501 (refer to FIG. 4(b)). The construction and operation of the master exposing apparatus used in this step is described in detail in the section [III. Master exposing apparatus].

Figure 4C:
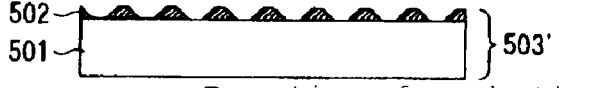

Thereafter, the master 503 is subjected to a development treatment to actualize the latent image of the pattern 504 to be a physical concave-convex pattern (refer to FIG. 4(c)).

Commonly, the master 503 is placed on a turntable of a developing machine, and while the turntable is rotated, a developer solution is dropped, but for example, a method of heaping a developer solution in a state that a glass substrate is placed still (so-called puddle-developing method) is also employed.

In this step, by selecting the type of photoresist 502, it is possible to form the latent image of the pattern 504 into a concave pattern, or on the contrary, it is possible to form the latent image of the pattern 504 into a convex pattern. Commonly, a photoresist (it is called as "positive resist") forming the pattern 504 into a concave pattern is employed in most cases.

In this specification, explanation is made mostly with respect to a case of employing a positive resist, but a photoresist (it is called as "negative resist") forming the pattern 504 into a convex pattern may also be employed, and its selection is optional.

According to the above process, a master (it is called as a "concave-convex master") 503' having a physical concave-convex pattern is obtained. By using this concave-convex master 503', a stamper is produced in the following process.

Figure 4D:
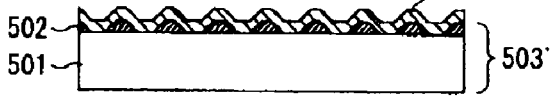

First, on the concave-convex master 503', by using a sputtering method or an electroless plating method, a film of the material of stamper is formed to form a conductive layer 505 (refer to FIG. 4(d)).

The material of stamper is usually a metal material. The metal material may, for example be nickel. One type of the material of stamper may be used alone or at least two types of the materials of stamper may be used in optional combination at an optional ratio for use.

The thickness of the conductive layer 505 is not particularly limited, and the thickness can be optionally selected so long as the thickness does not cause a problem in an electrical plating step to be described later.

Figure 4E:

Next, the concave-convex master 503' on which the conductive layer is formed is attached to an electroforming apparatus, and by using e.g. an electrical plating method, the material of stamper is further laminated on the conductive layer 505 to form a father layer 506 (refer to FIG. 4(e)). The father layer 506 is integrally formed with the conductive layer 505, and its thickness is not particularly limited, but the thickness is usually at least 100 μm and usually at most 500 μm.

Figure 4F:

Subsequently, the father layer 506 is separated from the concave-convex master 503', and as the case requires, the photoresist adhered to the father layer 506 is removed by using e.g. a photoresist remover solution (refer to FIG. 4(f)). The photoresist remover solution may be appropriately selected according to the type of photoresist 502. For example, acetone or N-303C manufactured by Nagase Chemtex Corporation may be used. One type of photoresist remover solution may be used alone or at least two types of such a solution may be used in optional combination at an optional ratio.

The father layer 506 obtained is called as a father stamper (hereinafter referred to as "father 506"). On the father 506, the concave-convex pattern is transferred, and the concave-convex pattern has a reversed profile of the concave-convex pattern on the concave-convex master 503'.

Figure 4G:

Subsequently, the concave-convex pattern surface of the father 506 is subjected to e.g. an oxidation treatment, to form a separation layer 507 (refer to FIG. 4(g)). The thickness of the separation layer 507 is not particularly limited, but it is usually at least 0.1 nm and usually at most 100 nm.

Figure 4H:
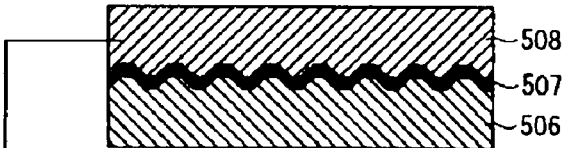

Further, on the separation layer 507, by using e.g. an electrical plating method, the material of stamper is laminated, to form a mother layer 508 (refer to FIG. 4(h)). The thickness of the mother layer 508 is not particularly limited, but it is usually at least 10 μm and at most 500 μm.

Figure 4I:

Subsequently, the mother layer 508 is separated (refer to FIG. 4(i)). The mother layer 508 obtained is called as a mother stamper (hereinafter referred to as "mother 508"). Also on the mother layer 508, a concave-convex pattern is transferred, and the concave-convex pattern has an identical profile of the concave-convex pattern on the concave-convex master 503'.

The father 506 or the mother 508 obtained in the above process each can be used as a stamper.

Further, by using any of these father stamper 506 and mother stamper 508 as a mold and by transferring its concave-convex pattern to another material, it is possible to produce a new stamper. For example, from the father stamper 506, it is possible to copy a plurality of mother stampers 508, and from such a mother stamper 508, it is possible to further copy a son stamper (not shown). A concave-convex pattern on the son stamper thus obtained is identical to the concave-convex pattern on the further stamper 506 (hereinafter such a son stamper may be simply referred to as "son").

Further, in a case of producing a stamper (resin stamper) made of a resin material, it is effective to use a method of producing a stamper (metal stamper) made of a metal material by the above process and injection-molding a resin material using the metal stamper as a mold to obtain a resin stamper in which the concave-convex pattern of the metal stamper is copied.

II-2. Production of Information Recording Medium

By using the stamper produced in the above process as a mold, a concave-convex pattern is formed on a substrate or an intermediate layer, etc. to produce the information recording medium of the present invention.

In a case of producing a single layer type information recording medium 100 shown in FIG. 1(*a*), first of all, by using the above stamper, a substrate 101 on which a concave-convex pattern corresponding to a track is formed is produced. Specifically, for example, the substrate 101 can be produced by using the above stamper as a mold, injection-molding the material of the substrate 101 to produce the substrate 101 on which the concave-convex pattern of the stamper is transferred, and separating the substrate 101 obtained from the stamper to use the substrate 101. The material or the thickness, etc. of the substrate 101 is as described above. Further, the stamper is usually a stamper (metal stamper) made of a metal material.

The concave-convex pattern transferred from the stamper to the substrate 101 has a reversed profile of the concave-convex pattern of the stamper. For example, in a case of producing an in-groove type recordable Blu-ray disc, since the recording track is a concave pattern when it is observed from a laser beam incident side, the track can be produced by using a father stamper or a son stamper. On the other hand, in a case of producing an on-groove type recording type Blu-ray disc in which the convex side observed from laser beam incident side is used as a recording track, since the recording track is present on the convex side when it is observed from laser beam incident side, the track can be produced by using a mother stamper. Here, in an information recording medium employing an organic pigment for the recording layer, it is preferred to employ an in-groove mold from the viewpoints of production process and recording properties.

Subsequently, on the concave-convex pattern of the substrate 101, a reflective layer 102 is formed. The material and the thickness, etc. of the reflective layer 102 are as described above. The method for forming the reflective layer 102 may, for example be e.g. a sputtering method.

Thereafter, a recording layer 103 is formed on the reflective layer 102. The material and the thickness, etc. of the recording layer 103 are as described above. The method for forming the recording layer 103 may, for example, be a coating method such as a spin coating method when the recording layer 103 is made of an organic pigment material, and a sputtering method when it is made of an inorganic material.

Subsequently, a cover layer 104 is formed on the recording layer 103. The material and the thickness, etc. of the cover layer 104 are as described above. The method for forming the cover layer 104 may, for example, be a spin coating method. Further, a cover layer 104 prepared separately may be bonded to the recording layer 103 via e.g. an adhesive layer.

Further, when a double-layer type information recording medium 200 shown in FIG. 1(*b*) is produced, first of all, by using a stamper, a substrate 201 on which a concave-convex pattern of track is formed is produced. The process for forming the concave-convex pattern is the same as the case of substrate 101 of FIG. 1(*a*).

Subsequently, on the concave-convex pattern of the substrate 201, a first reflective layer 202 and a first recording layer 203 are laminated in this order. The materials, the thicknesses and the forming processes, etc. of these layers are the same as the case of reflective layer 202 and recording layer 103 of FIG. 1(*a*).

Subsequently, an intermediate layer 204 is formed on the first recording layer 203. The material and the thickness, etc. of the intermediate layer 204 are as described above. The method for forming the intermediate layer 204 may, for example, be a coating method.

At the time of forming the intermediate layer 204, a concave-convex pattern is formed by using a stamper. The process for forming the concave-convex pattern is not limited, and it is formed by transferring the concave-convex pattern of the stamper to the intermediate layer 204 by pressing the concave-convex pattern of the stamper onto the intermediate layer 204.

A preferred method may a method of employing as the material of the interlayer 204 a photocurable resin such as a UV-curable resin or a visible light curable resin, and forming a film of such a photocurable resin of a desired thickness on the first recording layer 203. Thereafter, in a state that a stamper is further placed on the film of photocurable resin, the photocurable resin is irradiated with light such as UV-rays or visible light capable of curing the photocurable resin through the stamper, to cure the photocurable resin. By this method, an intermediate layer 204 on which the concave-convex pattern of the stamper is transferred can be formed. Here, as the stamper, a stamper (usually a resin stamper) made of a material capable of transmitting light such as UV-rays or visible light capable of curing the photocurable resin, is employed.

Here, the concave-convex pattern transferred from the stamper to the intermediate layer 204 has a reversed profile of the concave-convex pattern of the stamper, and accordingly, as described above, the stamper can be selected from a mother stamper, a father stamper and a son stamper according to the type of desired information recording medium.

Subsequently, on the concave-convex pattern of the intermediate layer 204, a second reflective layer 205 and a second recording layer 206 are formed in this order. The materials, the thicknesses and the forming processes of these layers are substantially the same as those of the cases of the reflective layer 102 and the recording layer 103 of FIG. 1(*a*).

Thereafter, a cover layer 207 is formed on the second recording layer 206. The material, the thickness and the forming process, etc. of the cover layer 207 are substantially the same as those of the cover layer 104 of FIG. 1(*a*).

In a case of double-layer type information recording medium 200 shown in FIG. 1(*b*), the shape of concave-convex pattern of a track of the substrate 201 may be the same or different from the shape of concave-convex pattern of a track of the intermediate layer 204. When the shapes of concave-convex patterns of the substrate 201 and the intermediate layer 204 are different from each other, it is sufficient that at least one of the substrate 201 and the intermediate layer 204 satisfies the limitation of the present invention. Namely, it is sufficient that one of them has the first recording region R1, the second recording region R2 and the recording region transition section Sx defined in the present invention. Further, it is also sufficient that both of the substrate 201 and the intermediate layer 204 satisfy the limitation of the present invention.

Further, also in a case of information recording medium in which tracks are present in at least three layers (that is an information recording medium having at least three recording layers), it is sufficient that any one of these satisfy the limitation of the present invention, but it is also sufficient that all of these layers satisfy the limitation of the present invention.

The information recording medium of the present invention is produced in the above process.

Here, the above description is made using a recordable Blu-ray disc as an example, but other information recording media can also be produced by appropriately modifying the above procedure. For example, a DVD (Digital Versatile Disc) may be produced by laminating substrates of each 0.6 mm thick.

III. Master Exposing Apparatus

The information recording medium of the present invention has, as described above, a predetermined groove shape transition section Sg in addition to a track pitch transition section Stp, between two recording regions having different track pitches and groove shapes. This groove shape transition section Sg is formed according to a concave-convex pattern shape of a stamper used at a time of producing an information recording medium.

The concave-convex pattern shape of stamper is realized by a master exposing apparatus in an exposure step (refer to the above FIG. 4(b)) of master in the process of producing a stamper.

In the following, a master exposing apparatus (master exposing apparatus of the present invention) to be used for producing the information recording medium of the present invention, is described with reference to embodiments.

III-1. Basic Construction

The basic construction of a master exposing apparatus according to an embodiment of the present invention, is described with reference to FIG. 5. Here, FIG. 5 is a functional block diagram schematically showing an example of the basic construction of the master exposing apparatus according to an embodiment of the present invention.

Figure 5:
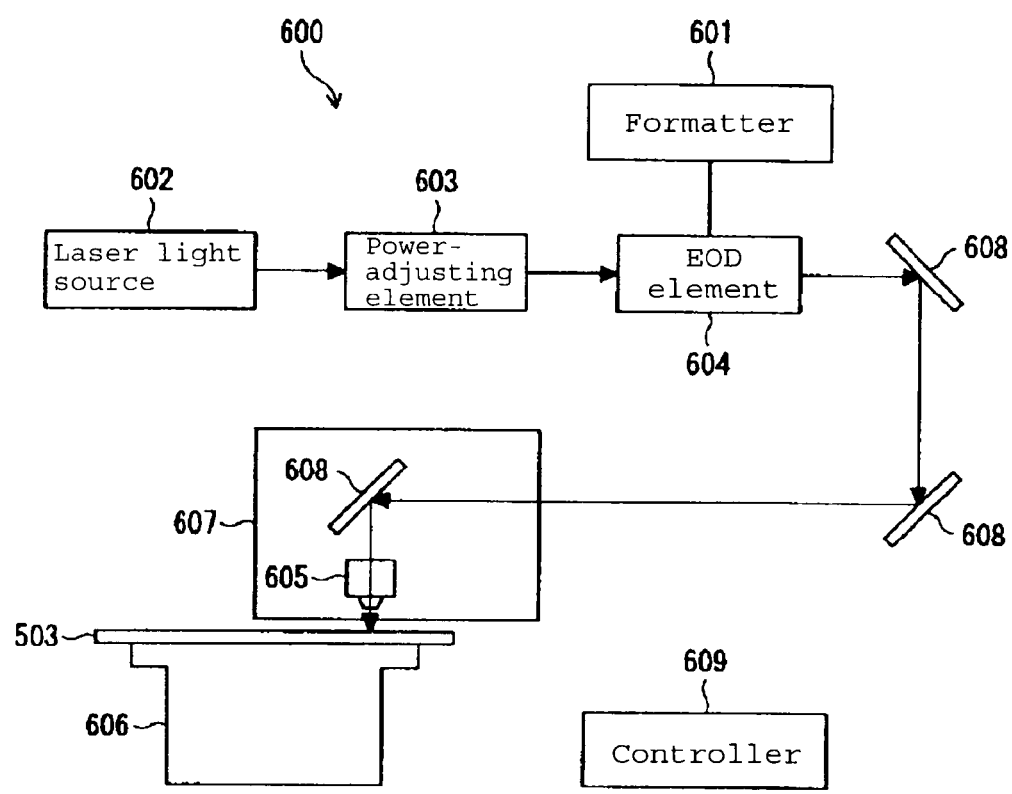
FIG. 5 is a functional block diagram schematically showing the basic construction of a master exposing apparatus according to an embodiment of the present invention.

A master exposing apparatus 600 shown in FIG. 5 has a formatter (deflection signal generating mechanism) 601 for generating a predetermined deflection signal, a laser light source (recording light source) 602 for generating recording light, a power-adjusting element (recording light intensity adjusting mechanism) 603 for adjusting the recording light to a predetermined power, an EOD (Electro Optical Deflector) element (recording light deflecting mechanism) 604 for deflecting a laser beam according to an output signal of the formatter 601, an objective lens (light-converging mechanism) 605 for converging the laser beam on a master 503, a turntable (rotating mechanism) 606 for receiving and rotating the master 503, a slider (radially moving mechanism) 607 for relatively moving the objective lens 605 in a radial direction of the master 503, and a single or a plurality of mirrors 608 for controlling the direction of laser beam. Further, the apparatus has a controller (controlling mechanism) for controlling a part or all of these constituents 601 to 608 so as to cooperate together. Particularly, the controller 609 has a function of controlling the rotating speed of the turntable 606, the moving speed of the slider 607 and the position of the objective lens 605 based on preset values.

Recording light emitted from the laser light source 602 at first passes through the power adjusting element 603. The power adjusting element 603 can change the recording light intensity according to a preset value.

The recording light having an intensity adjusted by the power adjusting element 603 is then lead to the EOD element 604 for deflecting the recording light.

In this embodiment, the EOD element 604 is employed, but the element is not particularly limited to the EOD element 604 so long as it has a function of deflecting recording light, and for example, an AOD (Acoustic Optical Deflector) element may also be employed. The EOD element 604 is connected with the formatter 601 and the EOD element 604 can deflect the recording light in an angular direction according to a signal generated by the formatter 601.

Here, depending on the type of information recording medium to be produced, an AOM (Acoustic Optical Modulator) element or an EOM (Electro Optical Modulator) element (not shown in FIG. 5) may be provided for modulating recording light.

Further, a single element may be employed which has both the function of modulating recording light and the function of deflecting the recording light, and the construction may be optionally modified according to the type of information recording medium to be produced.

Next, the recording light output from the EOD element 604 is guided to the objective lens 605 for converging the light on the master 503. Here, the recording light may pass through a beam expander (not shown in FIG. 5) for shaping the beam shape before the recording light is incident into the objective lens 605.

Further, the objective lens 605 is attached to a focus actuator (not shown in FIG. 5) and focus servo is actuated so as to maintain the distance between the master 503 surface and the objective lens 605 always constant. By actuating focus servo, it is possible to maintain the distance between the master 503 surface and the objective lens 605 constant, and accordingly, a spot size of the recording light converged on the master 503 surface becomes always constant, and a pattern having a uniform width can be formed by the light exposure.

Here, a pattern corresponding to a spiral-shaped track can be formed on the master 503 by feeding the slider 607 at a predetermined feeding speed while the turntable 606 on which the master 503 is placed is rotated at a predetermined rotational speed.

Next, operation of the master exposing apparatus 601 having the above construction is described. According to a linear velocity and track pitch set in advance, the turntable 606 is rotated and the slider is moved at a predetermined speed. Namely, a pattern corresponding to a track in the first recording region R1 having a first track pitch is formed.

Here, the rotational direction and the rotational speed of the turntable 606, the moving speed and the moving direction of the slider 607, can be optionally selected according to a format of a stamper and an information recording medium that are desired to be produced, and appropriate operation conditions may be selected.

Further, the intensity of recording light may also be optionally selected according to various production steps or a groove shape desired to be formed.

When the information recording medium of the present invention is a recordable Blu-ray disc, its groove is formed so as to wobble in a radial direction of the medium at a predetermined amplitude. A few types of wobble patterns are defined in advance, and by combining the plurality of types of wobble patterns, information such as address information or disc manufacturer information are recorded.

Recording of an information by a wobble pattern means recording of the information by changing a wobble pattern of groove in a disc surface, that is, by changing the amplitude or the period of the wobble, and does not mean recording by change of groove depth, groove width or average track pitch. Such a wobble of groove can be formed by deflecting the recording light at a predetermined amount in the radial direction of the master 503 in the master exposing apparatus 600. The deflection signal for deflecting recording light is generated by the formatter 601, the deflection of recording light is generated by the EOD element 604. Here, the wobble pattern can be optionally selected by changing the internal construction of the formatter 601. Accordingly, in a case of producing an information recording medium other than a recordable Blu-ray disc as the information recording medium of the present invention, an appropriate wobble pattern for the information recording medium can be formed by changing the internal construction of formatter.

When formation of a pattern corresponding to a track in the first recording region R1 is completed by the above process, then, the process moves to formation of a pattern corresponding to a track in the second recording region R2 having a second track pitch. Since the track pitch transition section Stp and the groove shape transition section Sg are formed in this step, a method for forming the track pitch transition section Stp and the groove shape transition section Sg will be described.

The track pitch transition section Stp can be formed by changing movement speed of the slider 607. For example, it is formed by memorizing in advance in the master exposing apparatus 600 a radial position at which formation of the track pitch transition section Stp is desired to start, and changing the movement speed of the slider 607 when passing of the slider 607 through the radial value is detected. The method for changing moving speed may, for example, be a method of changing frequency of a series of pulses for driving the slider 607. In this step, by e.g. changing a sweeping time of the frequency of the series of pulses for driving the slider 607, it is possible to produce a track pitch transition section Stp having an optional length. When a longer track pitch transition section Stp is desired, it is sufficient to increase the sweeping time of frequency, and when a shorter track pitch transition section Stp is desired, it is sufficient to reduce the sweeping time of frequency. The movement speed of the slider 607 may be changed stepwisely, but in order to make the change of track pitch smooth, it is preferred to change the moving speed of slider 607 continuously.

Meanwhile, as the process for producing groove shape transition section Sg, two embodiments are considered, and the construction of the master exposing apparatus 600 changes according to the embodiments. These embodiments will be described in the following.

III-2. First Embodiment

In the first embodiment, a mechanism (recording light intensity sweeping mechanism) for sweeping the intensity of recording light in simple increase form or simple decrease form according to a preset value, is provided with the master exposing apparatus 600. Namely, at a time of forming a concave-convex pattern corresponding to the groove shape transition section Sg, by sweeping the intensity of recording light in simple increase form or simple decrease form, it is possible to form a pattern (that is a concave-convex pattern corresponding to the groove shape transition section Sg) wherein the groove width gradually changes from w1 to w2 and/or the groove depth gradually changes from d1 to d2.

In the first embodiment, since it is possible to suppress rapid change of groove shape due to rapid change of recording light intensity, it is possible to suppress rapid change of normalized push-pull signal amplitude in an information recording medium finally obtained. Namely, by the first embodiment, it becomes possible to obtain an information recording medium enabling to realize stable focus servo and tracking servo states.

The recording light intensity sweeping mechanism preferably has a function of detecting arrival of the focusing mechanism at a preset predetermined radial position and starting and/or ending the sweep of recording light intensity. Further, it is also preferred that the recording light intensity sweeping mechanism has a function of detecting output of preset predetermined address from the above deflection signal generating mechanism, and starting and/or ending the sweep of recording light intensity.

The recording light intensity sweeping mechanism having the above functions can always produce a master in which a starting point of recording light intensity change is accurately maintained at a constant position, and accordingly, it is possible to make the nature of change of normalized push-pull signal amplitude in an information recording medium finally obtained to be always constant. Namely, it is possible to obtain an information recording medium capable realizing stable focus servo and tracking servo states.

Further, it is also preferred that the recording light intensity sweeping mechanism has a function of detecting arrival of the focusing mechanism at a preset predetermined radial position, starting sweep of recording light intensity upon the detection, and ending the sweep after a lapse of the preset predetermined time. Further, it is also preferred that the recording light intensity sweeping mechanism detects output of preset predetermined address from the deflection signal generating mechanism, and the recording light intensity sweeping mechanism starts sweeping of the recording light intensity, and ends the sweeping after lapse of a preliminary set predetermined time.

When the recording light intensity sweeping mechanism has these functions, since it is sufficient that the recording light intensity sweeping mechanism only monitors a sweeping start trigger and controls sweeping time, it is possible to make the construction of master exposing apparatus simple.

Here, the various types of functions of the recording light intensity sweeping mechanism described above, can be realized as functions of the controller 609 by configuring the controller 609 to operate desired operations by using e.g. a software.

III-3. Second Embodiment

The present invention has an object of suppressing rapid change of normalized push-pull signal amplitude in a border portion of two recording regions having different track pitches. Particularly, so long as the normalized push-pull signal amplitude change can be suppressed to a level causing no problem in practical use, it is not necessary that the groove shape continuously changes, and it may change discontinuously. From such a viewpoint, a master exposing apparatus having more simple construction than that of the first embodiment and that can be maintained easily is also considered.

In the second embodiment, the above master exposing apparatus 600 is further provided with: a recording light intensity adjusting mechanism for adjusting the recording light intensity by an interpolation method based on the position of the objective lens (focusing mechanism) 605 and the set value of recording light intensity at a preset predetermined radial position; and a repeating operation mechanism for repeatedly carrying out the above recording light intensity adjusting operation. Further, in the second embodiment, an operation time required for carrying out one cycle of the above repeating operation mechanism is set to be at most 100 msec.

Figure 6:
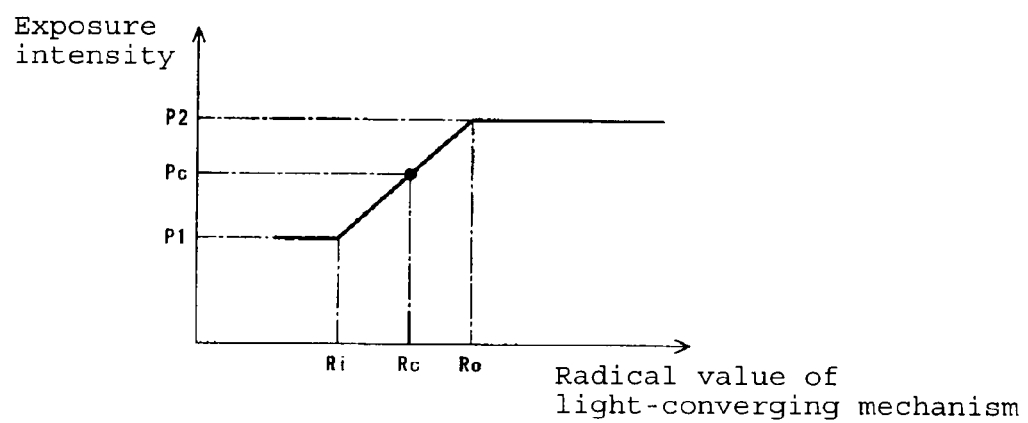
FIG. 6 is a graph showing the relation between theoretical exposure intensity obtained by continuous interpolation and the radial value of light-converging mechanism in a second embodiment of the master exposing apparatus according to an embodiment of the present invention.
Figure 7:
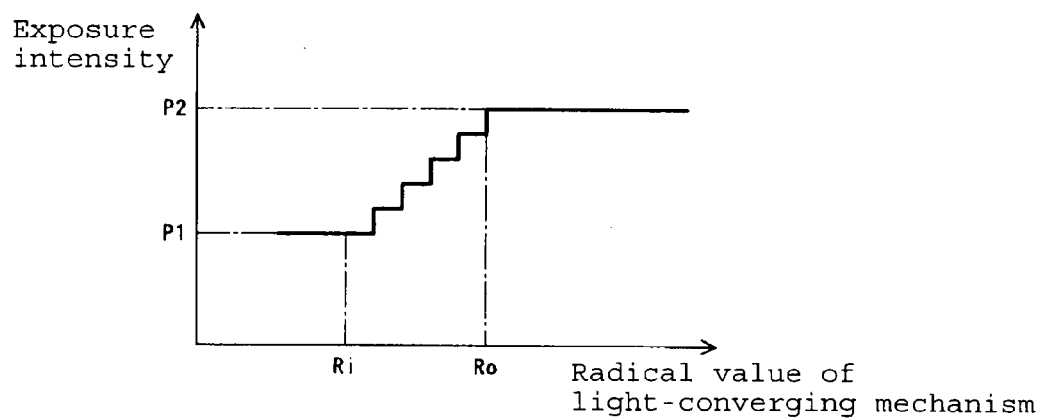
FIG. 7 is a graph showing the relation between actual exposure intensity obtained by repeating interpolation operation and the radial value of light-converging mechanism in the second embodiment of the master exposing apparatus according to an embodiment of the present invention.

Basic operation of the master exposing apparatus according to this embodiment is described in detail below with reference to FIGS. 6 and 7. FIG. 6 is a graph showing the relation between theoretical exposure intensity and radial value of the focusing mechanism obtained by continuous interpolation in the master exposing apparatus according to this embodiment. FIG. 7 is a graph showing the relation between actual exposure intensity and radial value of the focusing mechanism obtained by repeated interpolation operation in the master exposing apparatus according to this embodiment.

Further, the following descriptions are based on the following conditions.

(1) A case of forming a pattern corresponding to a track of an information recording medium in which the first recording region R1 is present in the inner peripheral side of the second recording region R2;

(2) A pattern corresponding to a track of the first recording region R1 is formed by exposure at an exposure intensity P1;

(3) A pattern corresponding to a track in the second recording region R2 is formed by exposure at an exposure intensity P2;

(4) A pattern corresponding to a track in the groove shape transition section Sg is formed from a radial value Ri to a radial value Ro;

(5) Exposure power at the radial value Ri equals to P1;

(6) Exposure power at the radial value Ro equals to P2; and (7) Exposing operation is carried out from the inner peripheral side towards the outer peripheral side.

Here, with respect to detail of e.g. setting of exposure powers or radial values, various types of cases are considered, and accordingly, the present invention is not limited to one carried out under the above conditions (1) to (7), but the present invention can be carried out with various modifications within the gist of the present invention.

Further, in the master exposing apparatus according to this embodiment, parameters such as an exposure power P1 at a time of forming a pattern corresponding to a track in the first recording region R1, an exposure power P2 at a time of forming a pattern corresponding to a track in the second recording region R2, and an inside radial value Ri and an outside radial value Ro of the groove shape transition section Sg, are assumed to be e.g. memorized in the master exposing apparatus in advance.

According to this embodiment, while a turntable 606 is rotated according to a linear velocity and a track pitch set in advance and a slider 607 is moved at a predetermined speed, a recording light intensity adjusting mechanism reads out the radial direction of an objective lens 605 on a master, and what region is being exposed by the objective lens 605 is judged first. Subsequently, according to the judgment result, the exposure intensity is set to be an appropriate value. Meanwhile, since the slider 607 is always moving at a predetermined speed, at a timing when the exposure light intensity is set to an appropriate value, the objective lens 605 has already moved to a radial position different from that was originally read out. To cope with this problem, the radial position of the objective lens 605 is read out again, and what region is exposed by the objective lens 605 is judged again, and based on the judgment result, the exposure intensity is changed to an appropriate value. Thus, by performing these operations from read out of radial position to setting of exposure intensity as one cycle, and by repeating this cycle operation until the objective lens 605 moves to a desired radial position, it is possible to carry out exposure of desired exposure intensity on the entire master surface.

This interpolation operation will be described in more detail in the following. Here, for simplification, an operation time required to carry out one cycle from read out of radial position to setting of exposure intensity is designated as Tu. Here, Tu is a value depending on performance of the master exposing apparatus.

Namely, when the objective lens 605 is exposing the first recording region R1, the recording light intensity adjusting mechanism adjusts the exposure intensity to be P1, and when the objective lens 605 is exposing the second recording region R2, the recording light intensity adjusting mechanism adjusts the exposure light intensity to be P2. When the objective lens 605 is judged as exposing the groove shape transition section Sg, for example as shown in FIG. 6, the recording light intensity adjusting mechanism adjusts the exposure intensity to be one obtained by interpolation between Ri and Ro by a function of appropriate form. Namely, when the first recording region R1 is present more inner peripheral side than the second recording region R2, and when the exposure intensity between Ri and Ro is obtained by interpolation using a linear function, an exposure power Pc when the objective lens 605 is present at a radial position Rc (where $Ri \leq Rc \leq Ro$) can be calculated by the following formula.

$$Pc=(P2-P1)\times(Rc-Ri)/(Ro-Ri)+P1$$

Here, in the above explanation, the exposure intensity is obtained by interpolation using a linear function, but the form of function is not limited to linear function, and for example, the exposure intensity may be adjusted by using a quadratic function. Namely, it is important that the exposure intensity is set by interpolation by calculation.

Meanwhile, as described above, since the master exposing apparatus requires repeating operation time Tu, the actual exposure intensity in the groove shape transition section Sg does not become as shown in FIG. 6, but it becomes stepwise as shown in FIG. 7. Here, a track length Su corresponding to one step of the steps corresponds to a product obtained by multiplying Tu by an exposure linear velocity LV, and is represented by the following formula.

$$Su = LV \times Tu$$

The basic operation of the master exposing apparatus according to this embodiment is as described above. Namely, after formation of the first recording region R1 is completed and when a groove shape transition section Sg is formed, the radial position of the objective lens 605 is sequentially read out and the recording light intensity is changed stepwisely, whereby the groove shape in the groove shape transition section Sg can be changed stepwisely. Further, since it is preferred to suppress change of normalized push-pull signal amplitude to a certain level, it is preferred to shorten the track length Su corresponding to one step of the stepwisely changed groove shape to a certain length.

In order to shorten Su, since Su is a product obtained by multiplying an exposure linear velocity LV and Tu, Su can be shortened by reducing LV or reducing Tu.

However, if LV is reduced, there occurs a problem that long exposure time is required. When the long exposure time is required, not only productivity is deteriorated, but there occurs a problem that it is difficult to maintain stability of the master exposing apparatus for long time.

In order to reduce Su, it is better to reduce Tu, and in order to obtain practical LV, Tu is preferably at most 100 msec. If Tu is too long, when exposure is made at a practical exposure linear velocity, groove shape change in the groove shape transition section Sg becomes extremely rough and quick change of normalized push-pull signal amplitude cannot be suppressed in some cases.

EXAMPLES

Now, the present invention will be described in more detail with reference to Examples, but the present invention is not construed as limited to these Examples so long as it does not depart from the gist of the present invention.

In the following Examples and Comparative Examples, as information recording media, recordable Blu-ray discs were prepared under different forming conditions of groove shape transition sections Sg and track pitch transition sections Stp, and information in the information recording media obtained were reproduced by an information reproduction apparatus for evaluation.

Production of Stamper

In order to produce each of information recording media of Examples and Comparative Examples having desired groove shape transition sections Sg and track pitch transition sections Stp, first, a stamper (father) having concave-convex patterns corresponding to objective groove shape transition section Sg and track pitch transition section Stp was produced.

Each stamper was produced by the method described in the above section of "II-1. Production of stamper". Specifically, a master 503 comprising a master substrate 501 that is a glass plate of 6 mm thick on which a photoresist 502 layer of 60 nm thick was formed was employed, and the master 503 was exposed under the following conditions and developed to obtain a concave-convex master 503'. On this concave-convex master 503', a nickel film (conductive layer 505) of 20 nm thick was formed by using a sputtering method, and nickel was further piled up by an electrical plating method to form a father layer 506 of 290 μm. This father layer 506 was separated to obtain a father stamper 506.

Here, exposure of master was carried out under the following conditions.

In a recordable Blu-ray disc, a PIC region corresponds to an inner peripheral side and a user data region corresponds to an outer peripheral side of the disc. The direction of track starts from the PIC region towards the user data region, and exposure of master is also carried out in a direction of from the PIC region to the user data region.

Further in each of the Examples and in each of Comparative Examples, the first recording region R1 indicates PIC region and a second recording region R2 indicates the user data region, and the track pitch tp1 in the first recording region R1 was set to 0.35 μm and the track pitch tp2 in the second recording region R2 was set to 0.32 μm.

Groove shapes in the PIC region and the user data region were prepared so that the normalized push-pull signal amplitude NPP satisfied the following control ranges. As specific values, the groove depth was set to 30 nm and the groove width was set to 0.10 μm in the PIC region, and the groove depth was set to 60 nm and the groove width was set to 0.19 μm in the user data region.

Adjustment of exposure light intensity at the time of exposing master in Example 3 was carried out by using a master exposing apparatus (master exposing apparatus provided with a recording light intensity adjusting mechanism and repeating operation mechanism) according to the above second embodiment. In other Examples and Comparative Examples, the adjustment was carried of by using the master exposing apparatus (master exposing apparatus provided with recording light intensity sweeping mechanism) according to the above first embodiment.

Preparation of Information Recording Medium

Each of information media of the Examples and Comparative Examples was produced by producing a substrate by using the above stamper, and forming on the substrate a reflective layer, a recording layer, a interface layer and a cover layer in this order.

Specifically, first, polycarbonate is used as the material of substrate, it is injection-molded by using the above stamper, to form a substrate on which the concave-convex pattern of the stamper was transferred. Here, the thickness of the substrate was 1.1 mm.

Subsequently, on this substrate, a reflective layer of 70 nm thick made of an AgNdCu alloy was formed by a sputtering method.

Subsequently, on this reflective layer, a metal-containing azo type pigment that was diluted by octafluoropentanol (OFP) was applied by spin coating to form a recording layer. Conditions of the spin coating method were as follows. Namely, 1.5 g of a solution in which a metal-containing azo type pigment was dissolved in OFP at a concentration of 1.0 wt %, was applied in the central portion of the substrate in a circular form, and the substrate was rotated at 1,200 rpm for 7 sec to expand the pigment. Thereafter, the substrate was rotated at 9,200 rpm for 3 sec to throw off the pigment to complete coating. Here, after the coating, the medium was placed in an environment of 100° C. for 1 hr to vaporize and remove the solvent OFP. The target thickness of the recording layer was about 30 nm.

Subsequently, on this recording layer, an interface layer made of $ZnS:SiO_2$ of 16 nm thick was formed by sputtering.

Subsequently, on this interface layer, a transparent cover layer having a total thickness of 100 μm comprising a sheet of polycarbonate resin of 75 μm thick and a pressure-sensitive adhesive layer of 25 μm thick, was laminated.

Information Reproduction Apparatus for Evaluation

In order to evaluate information recording medium of the Examples and Comparative Examples, an information reproduction apparatus (hereinafter referred to as "information reproduction apparatus for evaluation") having a construction shown in FIG. 8 was employed. Here, FIG. 8(a) is a functional block diagram showing the construction of a substantial part of an information reproduction apparatus for evaluation employed for evaluation of information recording media of Examples and Comparative Examples, and FIG. 8(b) is a view showing the construction of four-segment photodiode employed in the information reproduction apparatus for evaluation shown in FIG. 8(a).

Figure 8A:
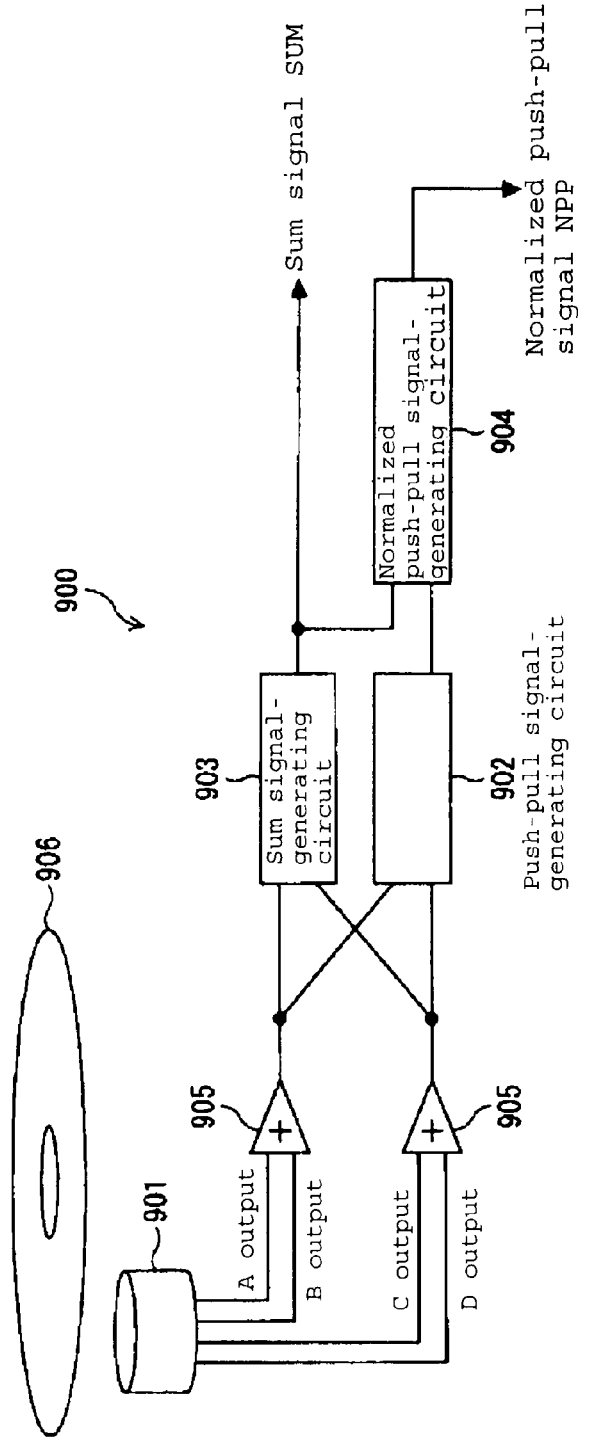
FIG. 8(a) is a functional block diagram showing the construction of main part of an information reproducing apparatus (hereinafter referred to as "information reproducing apparatus for evaluation") to be employed for evaluating information recording media of Examples and Comparative Examples.

An information reproduction apparatus 900 for evaluation shown in FIG. 8(a) has a four-segment photodiode 901, a push-pull signal generating circuit 902, a sum signal-generating circuit 903, a normalized push-pull signal generating circuit 904, a synthesizing circuit 905, a spindle motor (not shown), a light source such as semiconductor laser (not shown), an objective lens (not shown) and an amplifying circuit (not shown), etc. Further, the apparatus is configured so that an information recording medium 906 to be evaluated can be attached to the spindle motor.

A laser beam emitted from e.g. a semiconductor laser is converged on the information recording medium 906 attached to the spindle motor by the objective lens. A laser beam reflected from the information recording medium 906 is guided to the four-segment photodiode 901.

Figure 8B:
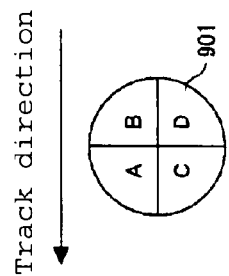
FIG. 8(b) is a view showing the construction of four-segment photodiode employed in the information reproducing apparatus for evaluation of FIG. 8(a).

The four-segment photodiode 901 comprises, as shown in FIG. 8(b), four segment detectors, and each of these detectors output an electrical signal corresponding to the intensity of laser beam incident into the detector.

Each of the electrical signals output from the detectors passes through e.g. an amplifying circuit (not shown) as the case requires, and guided to a push-pull signal generating circuit 902 and a sum signal generating circuit 903. The push-pull signal generating circuit 902 calculates (A+B)−(C+D) to generate a push-pull signal PP. Further, the sum signal generating circuit 903 calculates (A+B)+(C+D) to generate a sum signal SUM. Further, the normalized push-pull signal generating circuit 904 calculates PP/SUM from the push-pull signal PP and the sum signal SUM, to produce a normalized push-pull signal. Thereafter, based on the normalized push-pull signal, a servo unit (not shown) performs tracking control.

Here, A indicates a photodiode in a forward right side of a track direction, B indicates a photodiode in a rear right side of the track direction, C indicates a photodiode in forward left side of the track direction, and D indicates a photodiode in rear left side of the track direction.

Evaluation Procedure of Information Recording Medium

Evaluation of each of the information recording media of the Examples and Comparative Examples was carried out by using the above information reproduction apparatus 900 for evaluation in the following procedure.

A push-pull signal PP and a sum signal SUM in non-recorded state in the vicinity of the border between the PIC region and the user data region were measured by an oscilloscope in a state that no tracking servo was performed, to calculate NPP. Subsequently, change of NPP in the vicinity of the border between the PIC region and the user data region was evaluated to evaluate the NPP characteristic.

Here, with respect to Examples 1 to 3 and the Comparative Examples 1 and 2 described below, waveforms of the normalized push-pull signal amplitude NPP and the sum signal SUM measured by an oscilloscope in the above procedure, are shown in FIGS. 9 to 14. These waveforms each show a waveform corresponding to about a half circle of track of an information recording medium. Namely, the lateral axis of each of these figures corresponds to about a half circle of track.

Further, in each of the Examples and Comparative Examples, the control range of NPP in the PIC region is set to be from 0.26 to 0.52. When NPP is within this range in the PIC region, it is possible to realize statable focus servo and tracking servo in the PIC region.

Further, in each of the Examples and Comparative Examples, the target of NPP in non-recorded state in the user data region was set to be about 0.6, and the upper limit of NPP in non-recorded state in the user data region was set to be 0.8. Further, the lower limit of NPP in non-recorded state in the user data region was set to be 0.21. When NPP in non-recorded state in the user data region is within this range, it is possible to achieve stable focus servo and tracking states in the user data region.

Further, in each of the Examples and Comparative Examples, the control range of NPP in non-recorded state in the recording region transition section Sx, was set to be substantially the same as the range of the user data region that is the wider range in the control ranges of the PIC region and the user data region. Namely, the control range of NPP in non-recorded state in the recording region transition section Sx was set to be from 0.21 to 0.8.

Here, the above control range of NPP is a value changeable depending on the performance of servo system, and is appropriately determined depending on a servo system to be used.

The values set at this time were in ranges in which stable focus servo and tracking servo states are realized even by an apparatus having slightly lower performance than that of a normal servo apparatus.

Namely, when an information recording medium showing NPP of the above range in the entire surface of the information recording medium can be provided, it is considered to be possible to realize stable focus servo and tracking servo states with various recording and reproduction apparatuses. Here, NPP in the following Examples and Comparative Examples means always NPP in non-recorded state.

Example 1

At a time of exposure of master, the length Ltp of the track pitch transition section Stp along a track was set to be 3.2 m, and the length Lg of the groove shape transition section Sg along the track was set to be 4.5 m. The starting point of the track pitch transition section Stp was set to be a position corresponding to earlier timing than the starting point of the groove shape transition section Sg, and the length LL of the overlapping portion of Stp and Sg along the track was set to be 2.9 m. Here, the value of Lg/Ltp becomes 1.41, and the value of LL/Ltp becomes 0.91.

An information recording medium was produced under the above condition. This information recording medium is designated as an information recording medium of Example 1.

Figure 9:
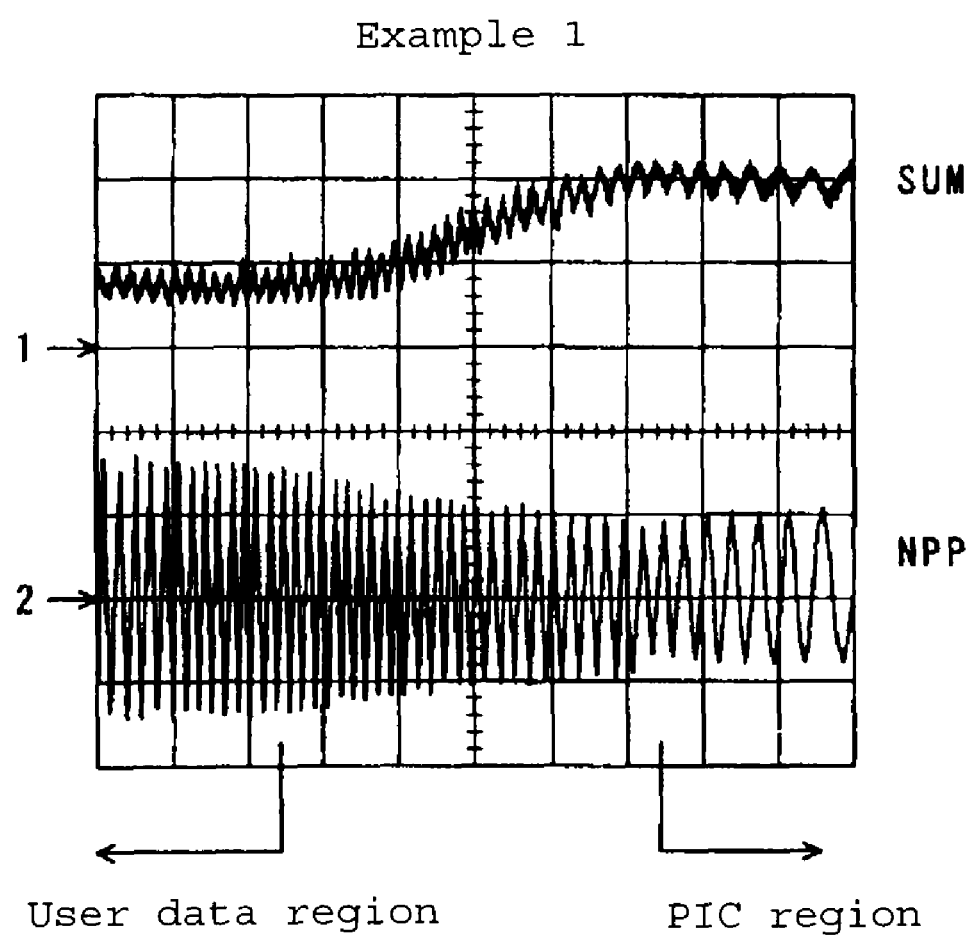
FIG. 9 is a view showing wave forms of a normalized push-pull signal amplitude NPP and a sum signal SUN in an information recording medium of Example 1 corresponding to a half circle of the information recording medium.

With respect to the information recording medium of Example 1, evaluation was made in the above procedure. The normalized push-pull signal NPP and the sum signal SUM in the vicinity of the border between the PIC region and the user data region obtained as a result are shown in FIG. 9.

In the information recording medium of Example 1, NPP in the PIC region was 0.3, and NPP in the user data region was 0.63.

Further, in the vicinity of the border between PIC region and user data region, NPP changes smoothly, and NPP did not exceed the lower limit or the upper limit of the predetermined NPP control range also in the recording region transition section Sx.

Further, NPP in the recording region transition section Sx was always larger than NPP in the PIC region, and is always smaller than NPP in the user data region.

It is understandable from the above results that in this Example, an information recording medium was obtained which can realize sufficiently stable focus servo and tracking servo states.

Example 2

At a time of exposure of master, the length Ltp of the track pitch transition section Stp along a track was set to be 3.2 m, and the length Lg of the groove shape transition section Sg along the track was set to be 2.5 m. The starting point of the track pitch transition section Stp and the starting point of the groove shape transition section Sg were set to be substantially the same position, and the length LL of an overlap portion of Stp and Sg along the track was set to be 2.5 m. Here, the value of Lg/Ltp becomes 0.78, and the value of LL/Ltp becomes 0.78.

An information recording medium was prepared under the above conditions. This information recording medium is designated as an information recording medium of Example 2.

Figure 10:
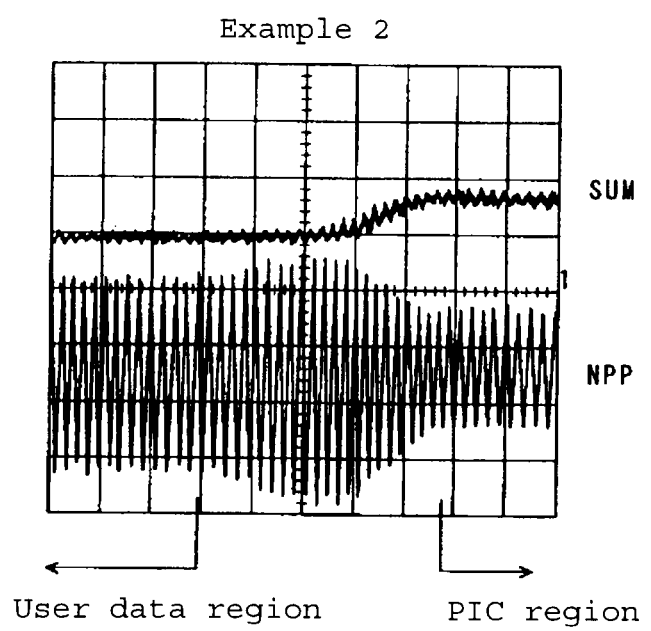
FIG. 10 is a view showing wave forms of a normalized push-pull signal amplitude NPP and a sum signal SUN in an information recording medium of Example 2 corresponding to a half circle of the information recording medium.

With respect to the information recording medium of Example 2, evaluation was made in the above procedure. The normalized push-pull signal amplitude NPP and the sum signal SUM in the vicinity of the border between the PIC region and the user data region are shown in FIG. 10.

In the information recording medium of Example 2, NPP in the PIC region was 0.39 and NPP in the user data region was 0.63.

Here, NPP in the recording region transition section Sx slightly increases in a part of the region, but the maximum value of NPP in the increased portion was 0.77, and it did not exceed the upper limit of the predetermined NPP control range.

It is understandable from the above results that in this Example, an information recording medium was obtained, which can realize stable focus servo and tracking servo states.

Example 3

At a time of exposure of master, the length Ltp of the track pitch transition section Stp along a track was set to be 1.6 m, and the length Lg of the groove shape transition section Sg along the track was set to be 3.9 m. The starting point of the track pitch transition section was set at a position corresponding to earlier timing than the starting point of the groove shape transition section Sg, and the length LL of an overlapping portion of Stp and Sg along the track was set to be 0.4 m. Here, the value of Lg/Ltp becomes 2.44, and the value of LL/Ltp becomes 0.25.

Further, at the time of exposure of master, by using the master exposing apparatus (a master exposing apparatus provided with a recording light intensity adjusting mechanism and a repeating operation mechanism) according to the second embodiment, an operation of adjusting recording light intensity by the recording light intensity adjusting mechanism was repeated every 90 msec in the recording region transition section Sx without carrying out exposure light intensity sweeping in the transition section between the PIC region and the user data region.

An information recording medium was produced under the above conditions. This information recording medium is designated as an information recording medium of Example 3.

Figure 11:
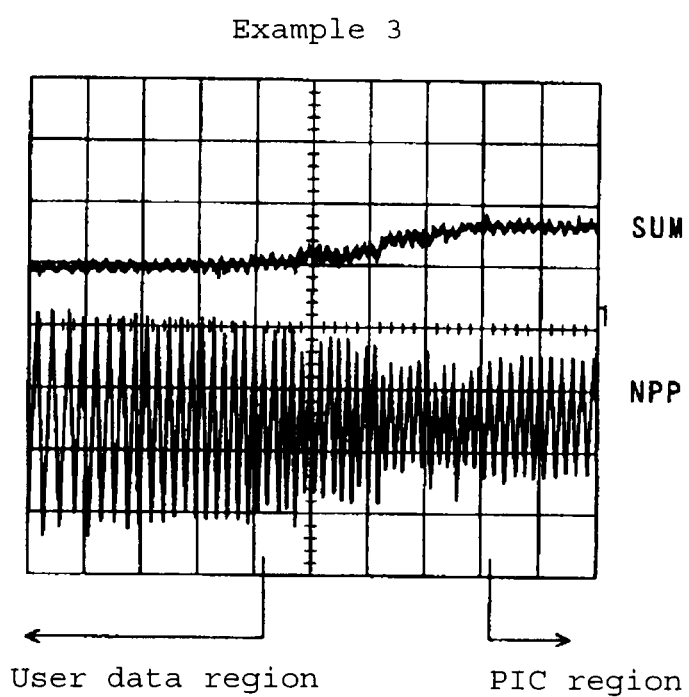
FIG. 11 is a view showing wave forms of a normalized push-pull signal amplitude NPP and a sum signal SUN in an information recording medium of Example 3 corresponding to a half circle of the information recording medium.

With respect to the information recording medium of Example 3, evaluation was made in the above procedure. The normalized push-pull signal amplitude NPP and the sum signal SUM in the vicinity of the border between the PIC region and the user data region obtained as a result are shown in FIG. 11.

In the information recording medium of Example 3, NPP in the PIC region was 0.34, and NPP in the user data region was 0.66.

Further, in the vicinity of the border between the PIC region and the user data region, a portion where NPP is small was present, but NPP in such portion was 0.26, and it does not exceed the lower limit of the predetermined NPP control range.

Namely, in the information recording medium having this construction, since the repeating operation cycle of the master exposing apparatus was less than 100 msec, no quick change of NPP was observed in the recording region transition section Sx. Further, there was no portion where NPP was extremely large and no portion where NPP was extremely small, and NPP did not exceed the lower limit or the upper limit of the predetermined NPP control range.

It is understandable from the above results that in this Example, an information recording medium was obtained, which can realize sufficiently stable focus servo and tracking servo states by fine adjustments of the focus servo circuit and a tracking servo circuit.

Examples 4 to 7

Information recording media were produced in substantially the same procedure as that of Example 1 except that values of Ltp, Lg and LL were set to be values shown in Table 1. These information recording media are designated as information recording media of Examples 4 to 7.

With respect to Examples 4 to 7, NPP was measured in the same manner as Examples 1 to 3, and as a result, NPP was within the predetermined value range, and an information recording medium was obtained, which can realize stable track focus servo and tracking servo states in each of these Examples.

Comparative Example 1

At a time of exposure of master, the length Ltp of the track pitch transition section Stp along a track was set to be 3.2 m, and the length Lg of the groove shape transition section Sg along the track was set to be 0.5 m. The end point of the track pitch transition section Stp and the starting point of the groove shape transition section Sg were set at substantially the same position, so that the length LL of an overlapping portion of Stp and Sg along the track became 0 m (that is no overlapping portion of Stp and Sg is present). Here, the value of Lg/Ltp becomes 0.16, and the value of LL/Ltp becomes 0.

An information recording medium was produced under the above conditions. This information recording medium is designated as an information recording medium of Comparative Example 1.

Figure 12:
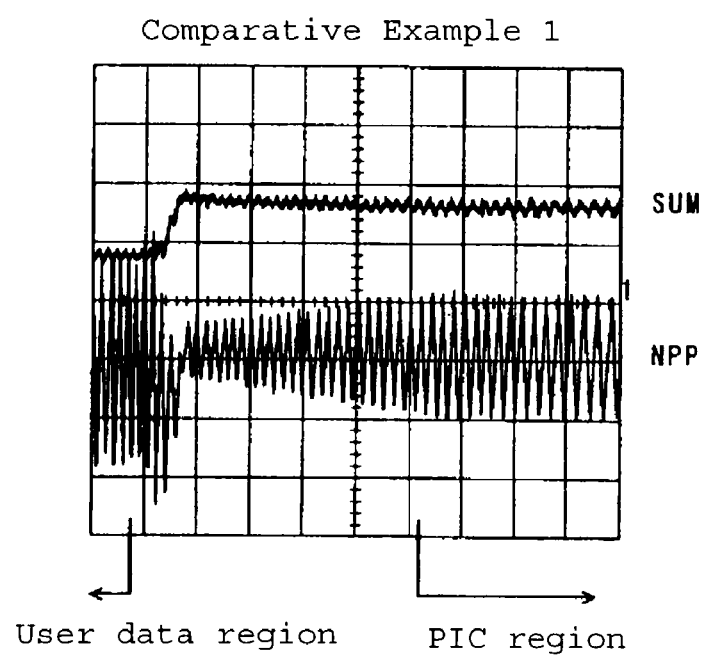
FIG. 12 is a view showing wave forms of a normalized push-pull signal amplitude NPP and a sum signal SUN in an information recording medium of Comparative Example 1 corresponding to a half circle of the information recording medium.

The normalized push-pull signal amplitude NPP and the sum signal SUM in the vicinity of the border between PIC region and user data region in the information recording medium of Comparative Example 1 are shown in FIG. 12.

In the information recording medium of Comparative Examples 1, NPP in the PIC region was 0.41, and NPP in the user data region was 0.67.

Further, the maximum value of NPP in the recording region transition section Sx was 0.9, and its minimum value was 0.07.

Namely, NPP exceeds the upper limit of the control range in a part of the region, and NPP exceeds the lower limit in another part of the region. When NPP exceeds the control range to this level, it is difficult to perform stable tracking servo.

Further, NPP changes relatively rapidly, and changes discontinuously. In such an information recording medium, an error of tracking servo may occur in the above portions.

Comparative Example 2

At a time of exposure of master, the length Ltp of the track pitch transition section Stp along a track was set to be 3.2 m, and the length Lg of the groove shape transition section Sg along the track was set to be 0 m so that the groove shape suddenly changed at the starting point of Stp and no groove shape transition section Sg was provided.

An information recording medium was prepared under the above conditions. This information recording medium is designated as an information recording medium of Comparative Example 2.

Figure 13:
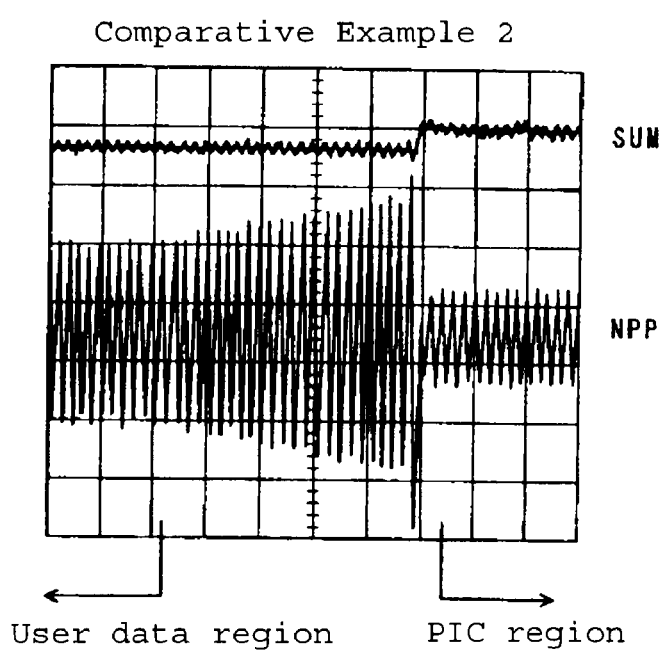
FIG. 13 is a view showing wave forms of a normalized push-pull signal amplitude NPP and a sum signal SUN in an information recording medium of Comparative Example 2 corresponding to a half circle of the information recording medium.

The normalized push-pull signal amplitude NPP and the sum signal SUM in the vicinity of the border between the PIC region and the user data region in the information recording medium of Comparative Example 2 are shown in FIG. 13.

In the information recording medium of Comparative Example 2, NPP in the PIC region was 0.3, and NPP in the user data region was 0.61.

Further, the maximum value of NPP in the recording region transition section Sx was 1.2, and its minimum value was 0.2.

Namely, there was position where NPP exceeded the upper limit of the control range, and a portion where NPP exceeded the lower limit. When NPP exceeds the control range to this level. It is difficult to perform stable tracking servo.

Further, NPP changes relatively rapidly, and changes discontinuously. In such an information recording medium, error of tracking servo may occur in the above portions.

Evaluation

The length Ltp of the track pitch transition section Stp along a track, the length Lg of the groove shape transition section Sg along the track, the length LL of an overlapping portion of the track pitch transition section Ltp and the groove shape transition section Sg, the value Lg/Ltp and the value LL/Ltp, of each of Examples and Comparative Examples are shown in Table 1 below.

TABLE 1

|         | Ltp (m) | Lg (m) | LL (m) | Lg/Ltp | LL/Ltp |
|---------|---------|--------|--------|--------|--------|
| Ex. 1   | 3.2     | 4.5    | 2.9    | 1.41   | 0.91   |
| Ex. 2   | 3.2     | 2.5    | 2.5    | 0.78   | 0.78   |
| Ex. 3   | 1.6     | 3.9    | 0.4    | 2.44   | 0.25   |
| Ex. 4   | 3.2     | 4.5    | 3.2    | 1.41   | 1.00   |
| Ex. 5   | 3.2     | 4.5    | 2.4    | 1.41   | 0.75   |
| Ex. 6   | 3.2     | 3.5    | 2.3    | 1.09   | 0.72   |
| Ex. 7   | 3.2     | 2.5    | 1.3    | 0.78   | 0.41   |
| Comp. Ex. 1 | 3.2 | 0.5    | 0.0    | 0.16   | 0.00   |
| Comp. Ex. 2 | 3.2 | 0.0    | 0.0    | 0.00   | 0.00   |

Figure 14:
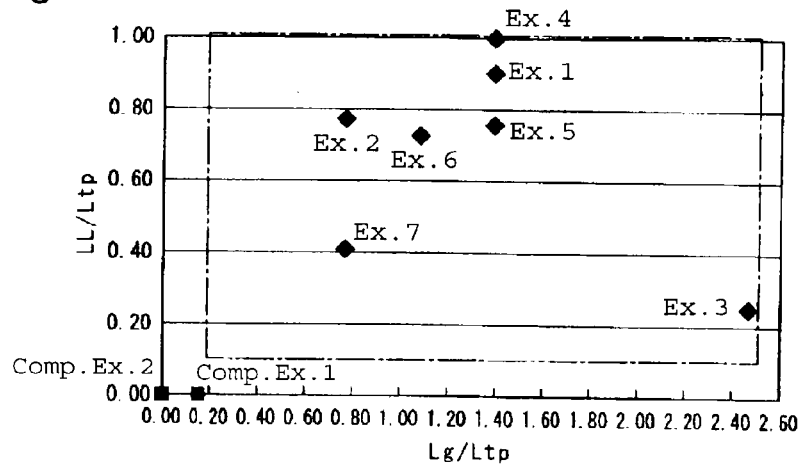
FIG. 14 is a view plotting the relation between Lg/Ltp and LL/Ltp of information recording media of Examples 1 to 7 and Comparative Examples 1 and 2.
Figure 15A:
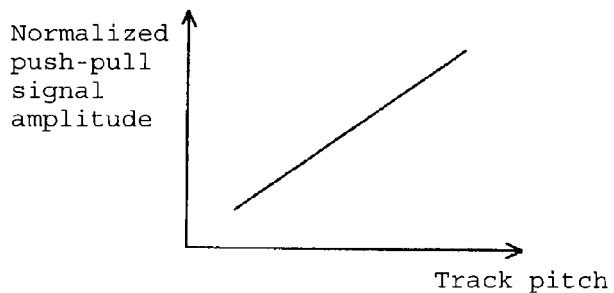
FIG. 15(a) to 15(c) are graphs showing correlations between normalized push-pull signal amplitude (differential signal of outputs of segments of two-segment photodetector whose detection plane is split in a direction along a groove track) and track pitch, groove depth and groove width respectively.
Figure 15B:
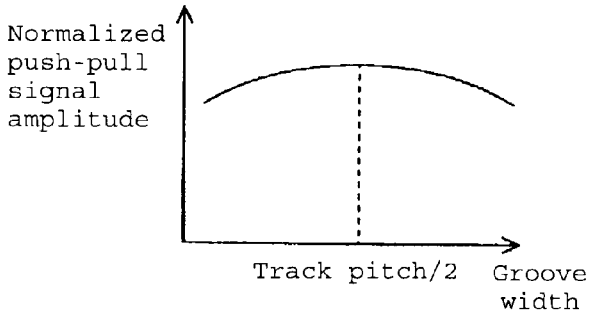
Figure 15C:
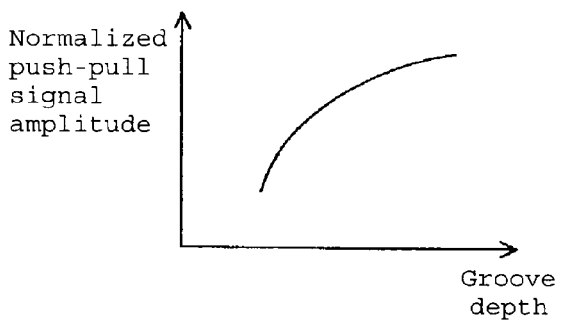
Figure 16:
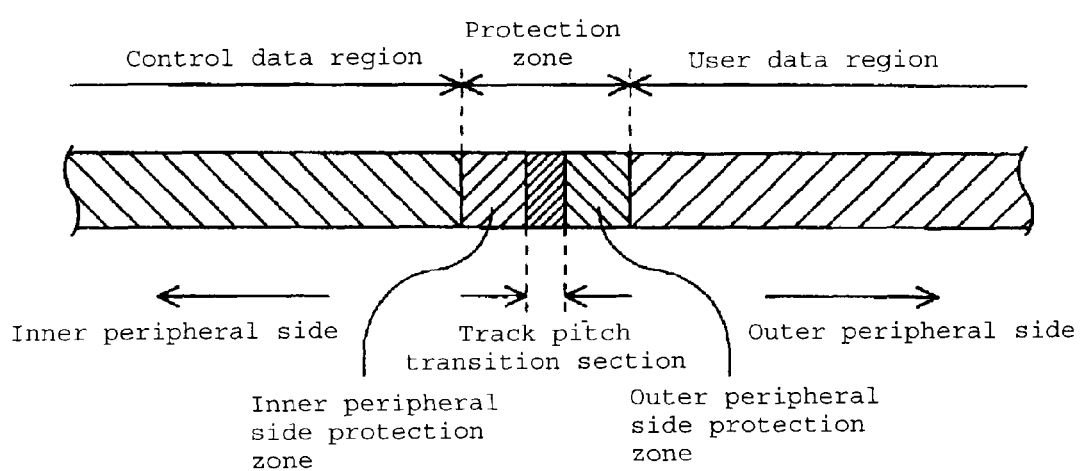
FIG. 16 is a view showing arrangement of a control data region, a user data region and a track pitch transition section Stp in a common recordable Blu-ray disc.

FIG. 14 is a view in which a correlation between Lg/Ltp and LL/Ltp is plotted with respect to each of the information recording media of Examples 1 to 7 and Comparative Examples 1 and 2. The frame of bold line in the graph shows the ranges of preferred Lg/Ltp and LL/Ltp values ($0.2 \leq Lg/Ltp \leq 2.5$, $0.1 \leq LL/Ltp \leq 1.0$) in the present invention.

The above results indicate that it is preferred to set Lg/Ltp and LL/Ltp values within the above preferred range for the purpose of achieving stable focus servo and tracking servo states.

INDUSTRIAL APPLICABILITY

The information recording medium and the master exposing apparatus of the present invention can be suitably used in a field of information recording media such as Blu-ray discs.

The entire disclosures of Japanese Patent Application No. 2006-324452 filed on Nov. 30, 2006 and Japanese Patent Application No. 2007-073272 filed on Mar. 20, 2007 including specifications, claims, drawings and summaries are incorporated herein by reference in their entireties.

The invention claimed is:

1. An information recording medium comprising a recording track formed by a concave-convex pattern, wherein
the recording track comprises a first recording region R1, a second recording region R2 and a recording region transition section Sx arranged between the first recording region R1 and the second recording region R2;
a track pitch tp1, a groove width w1 and a groove depth d1 in the first recording region R1, and a track pitch tp2, a groove width w2 and a groove depth d2 in the second recording region R2 satisfy formula (1), (2) and/or (3):

$$0 < |tp1 - tp2| \quad (1)$$

$$0 < |w1 - w2| \quad (2)$$

$$0 < |d1 - d2|; \quad (3)$$

the recording region transition section Sx comprises a track pitch transition section Stp in which the track pitch changes from tp1 to tp2 and a groove shape transition section Sg in which the groove width changes from w1 to w2 and/or the groove depth changes from d1 to d2;
the track pitch transition section Stp and the groove shape transition section Sg at least partially overlap to share a region SL; and
provided that a maximum value of normalized push-pull signal amplitude in a non-recorded state is $NPP_{max}$ and a minimum value of the amplitude is $NPP_{min}$ in the first recording region R1 and the second recording region R2, a normalized push-pull signal amplitude NPP satisfies formula (6) in the entire region of the recording region transition section Sx:

$$NPP_{min} \leq NPP \leq NPP_{max} \quad (6).$$

2. The information recording medium according to claim 1, wherein the first recording region R1, the second recording region R2 and the recording region transition section Sx are formed by a physically continuous groove.

3. The information recording medium according to claim 1 or 2, which comprises a recording layer containing an organic pigment.

4. The information recording medium according to claim 1 or 2, wherein the reflectivity of a recording mark portion is higher than the reflectivity of non-recorded portion.

5. The information recording medium according to claim 1 or 2, wherein a groove bottom portion, that is on far side of a concave-convex pattern from a surface of the information recording medium in which recording-reproduction light is incident, is used as the recording track.

6. The information recording medium according to claim 3, wherein the composition and the film thickness of the recording layer are constant at least among the first recording region R1, the second recording region R2 and the recording region transition section Sx.

7. The information recording medium according to claim 1 or 2, which is a disc-shaped information recording medium wherein the length Lg of the groove shape transition section Sg along the track is at least the length of one circle of the track in the disc-shaped information recording medium.

8. The information recording medium according to claim 1 or 2, wherein the groove width and/or the groove depth in the groove shape transition section Sg simply increases or simply decreases along the track.

9. The information recording medium according to claim 1 or 2, wherein the length Ltp of the track pitch transition section Stp along the track, and the length LL of the region SL shared by the track pitch transition section Stp and the groove shape transition section Sg, satisfy formulae (4) and (5):

$$0.2 \leq Lg/Ltp \leq 2.5 \quad (4)$$

$$0.1 \leq LL/Ltp \leq 1.0 \quad (5).$$

10. The information recording medium according to claim 1 or 2, wherein provided that a maximum value of the groove portion reflectivity in non-recorded state in the first recording region R1 and the second recording region R2 is $Rgv_{max}$ and its minimum value is $Rgv_{min}$, a groove portion reflectivity Rgv in a non-recorded state satisfies formula (7) in the entire region of the recording region transition section Sx:

$$Rgv_{min} \leq Rgv \leq Rgv_{max} \quad (7).$$

11. The information recording medium according to claim 1 or 2, wherein the first recording region R1 is arranged more inside than the second recording region R2, and a third recording region having a track pitch tp3 wider than the track pitch tp1 of the first recording region R1 and the track pitch tp2 of the second recording region R2, is arranged more inside than the first recording region R1.

12. The information recording medium according to claim 11, wherein no information is recorded by wobble of groove in the third recording region R3.

13. The information recording medium according to claim 11, wherein a track pitch transition section Stp' in which the track pitch changes from tp3 to tp1, is provided between the third recording region R3 and the first recording region R1.

14. The information recording medium according to claim 1 or 2, wherein the first recording region R1 includes a read only region storing a predetermined information, and the second recording region R2 includes readable-writable region in which user data is writable.

15. The information recording medium according to claim 14, wherein the track pitch in the read only region is 0.35 µm, and the track pitch in the readable-writable region is 0.32 µm.

16. The information recording medium according to claim 14, which satisfies a relation:

$$NPPAL_{max}/NPPAL_{min} \leq 3$$

provided that the normalized push-pull signal amplitude in the read only region is NPP1, the normalized push-pull signal amplitude in non-recorded state in the readable-writable region is NPP2, the normalized push-pull signal amplitude after recorded in the readable-writable region is NPP2a, the maximum value among maximum values of these parameters is $NPPAL_{max}$, and the minimum value among the minimum values of these parameters is $NPPAL_{min}$.

17. The information recording medium according to claim 16 which satisfies a relation:

$$NPPAL_{max}/NPPAL_{min} \leq 2.$$

18. The information recording medium according to claim 14, wherein a first wobble modulation method is applied to the read only region, a second wobble modulation method that is different from the first wobble modulation method is applied to the readable-writable region, and the same wobble modulation method as that for the readable-writable region is applied to the recording region transition section Sx.

* * * * *